(12) United States Patent
Tzivanis et al.

(10) Patent No.: US 6,855,077 B2
(45) Date of Patent: *Feb. 15, 2005

(54) PROCESS AND APPARATUS FOR PRODUCING A GOLF BALL WITH DEEP DIMPLES

(75) Inventors: Michael J. Tzivanis, Chicopee, MA (US); David M. Melanson, Northampton, MA (US); Vincent J. Simonds, Brimfield, MA (US); Kevin J. Shannon, Springfield, MA (US); Thomas J. Kennedy, III, Wilbraham, MA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/306,609

(22) Filed: Nov. 27, 2002

(65) Prior Publication Data

US 2003/0119610 A1 Jun. 26, 2003

Related U.S. Application Data

(60) Provisional application No. 60/337,123, filed on Dec. 4, 2001, provisional application No. 60/356,400, filed on Feb. 11, 2002, and provisional application No. 60/422,247, filed on Oct. 30, 2002.

(51) Int. Cl.$^7$ .............................................. A63B 37/14
(52) U.S. Cl. ....................................................... 473/384
(58) Field of Search .................................. 473/378–385

(56) References Cited

U.S. PATENT DOCUMENTS

| | | | |
|---|---|---|---|
| 4,979,747 A | * 12/1990 | Jonkouski | .................... 473/377 |
| 5,470,076 A | 11/1995 | Cadorniga | |
| 5,782,702 A | 7/1998 | Yamagishi | |
| 5,782,703 A | 7/1998 | Yamagishi | |
| 5,882,567 A | 3/1999 | Cavallaro et al. | |
| 5,947,844 A | 9/1999 | Shimosaka et al. | |
| 6,229,550 B1 | 5/2001 | Gloudemans et al. | |
| 6,290,614 B1 | 9/2001 | Kennedy, III et al. | |
| 6,302,808 B1 | 10/2001 | Dalton et al. | |
| 6,368,238 B1 | 4/2002 | Kasashima et al. | |
| 6,379,138 B1 | 4/2002 | Puniello et al. | |
| 6,659,886 B1 | 12/2003 | Yamagishi et al. | |
| 2002/0016435 A1 | 2/2002 | Simonutti et al. | |
| 2002/0037335 A1 | 3/2002 | Ogg et al. | |

\* cited by examiner

Primary Examiner—Raeann Gorden

(57) ABSTRACT

An apparatus and related techniques for making a golf ball with deep dimples are disclosed. The golf ball comprises a core and a cover layer, wherein the cover layer provides deep dimples that extend through the cover layer and/or into a layer or component underneath are disclosed. At least one percent (1%), preferably about five percent (5%), of the dimples of the ball comprise deep dimples. The cover may be a single layer or include multiple layers. If the cover is a multi-layer cover, the dimples extend to or into at least the first inner cover layer, and may extend to or into two or more inner cover layers. If the cover is a single layer, the dimples extend to or into the core. The dimples may be spherical or non-spherical, and the portion of the dimple that extends to or into the next inner layer may be the same or different shape as the outer portion of the dimple.

19 Claims, 17 Drawing Sheets

PROCESS AND APPARATUS FOR PRODUCING A GOLF BALL WITH DEEP DIMPLES

CROSS REFERENCES TO RELATED APPLICATIONS

The present application claims priority upon U.S. Provisional Application Ser. No. 60/337,123, filed Dec. 4, 2001; U.S. Provisional Application Ser. No. 60/356,400, filed Feb. 11, 2002; and U.S. Provisional Application Ser. No. 60/422,247, filed Oct. 30, 2002.

FIELD OF THE INVENTION

The present invention pertains to the art of making golf balls, and, more particularly, to golf balls having deep dimples. The present invention also relates to processes and apparatuses for forming multi-layer golf balls, and more particularly to processes and equipment for forming multi-layer golf balls having several deep dimples that extend through the outer cover layer to and/or into one or more layers or components thereunder.

BACKGROUND OF THE INVENTION

Golf balls are typically made by molding a core of elastomeric or polymeric material into a spheroid shape. A cover is then molded around the core. Sometimes, before the cover is molded about the core, an intermediate layer is molded about the core and the cover is then molded around the intermediate layer. The molding processes used for the cover and the intermediate layer are similar and usually involve either compression molding or injection molding.

In compression molding, the golf ball core is inserted into a central area of a two piece die and pre-sized sections of cover material are placed in each half of the die, which then clamps shut. The application of heat and pressure molds the cover material about the core.

Blends of polymeric materials have been used for modern golf ball covers because certain grades and combinations have offered certain levels of hardness to resist damage when the ball is hit with a club and elasticity to allow responsiveness to the hit. Some of these materials facilitate processing by compression molding, yet disadvantages have arisen. These disadvantages include the presence of seams in the cover, which occur where the pre-sized sections of cover material were joined, and long process cycle times which are required to heat the cover material and complete the molding process.

Injection molding of golf ball covers arose as a processing technique to overcome some of the disadvantages of compression molding. The process involves inserting a golf ball core into a die, closing the die and forcing a heated, viscous polymeric material into the die. The material is then cooled and the golf ball is removed from the die. Injection molding is well-suited for thermoplastic materials, but has limited application to some thermosetting polymers. However, certain types of these thermosetting polymers often exhibit the hardness and elasticity desired for a golf ball cover. Some of the most promising thermosetting materials are reactive, requiring two or more components to be mixed and rapidly transferred into a die before a polymerization reaction is complete. As a result, traditional injection molding techniques do not provide proper processing when applied to these materials.

Reaction injection molding is a processing technique used specifically for certain reactive thermosetting plastics. As mentioned above, by "reactive" it is meant that the polymer is formed from two or more components which react. Generally, the components, prior to reacting, exhibit relatively low viscosities. The low viscosities of the components allow the use of lower temperatures and pressures than those utilized in traditional injection molding. In reaction injection molding, the two or more components are combined and reacted to produce the final polymerized material. Mixing of these separate components is critical, a distinct difference from traditional injection molding.

The process of reaction injection molding a golf ball cover involves placing a golf ball core into a die, closing the die, injecting the reactive components into a mixing chamber where they combine, and transferring the combined material into the die. The mixing begins the polymerization reaction which is typically completed upon cooling of the cover material.

The present invention provides a new mold or die configuration and a new method of processing for reaction injection molding a golf ball cover or inner layer which promotes increased mixing of constituent materials, resulting in enhanced properties and the ability to explore the use of materials new to the golf ball art.

For certain applications it is desirable to produce a golf ball having a very thin cover layer. However, due to equipment limitations, it is often very difficult to mold a thin cover. Accordingly, it would be beneficial to provide an apparatus and technique for producing a relatively thin cover layer.

Moreover, retractable pins have been utilized to hold, or center, the core or core and mantle and/or cover layer(s) in place within an injection mold while molding an outer cover layer thereon. In such processes, the core or mantled ball is supported in the mold using retractable pins extending from the inner surface of the mold to the outer surface of the core or mantled ball. The pins in essence support the core or mantled ball while the cover layer is injected into the mold. Subsequently, the pins are retracted as the cover material fills the void between the core or mantle and the inner surface of the mold.

However, notwithstanding, the benefits produced through the use of the retractable pins, the pins sometimes produce centering difficulties and cosmetic problems (i.e. pin flash, pin marks, etc.) during retraction, which in turn require additional handling to produce a golf ball suitable for use and sale. Additionally, the lower the viscosity of the mantle and/or cover materials, the greater the tendency for the retractable pins to stick due to material accumulation, making it necessary to shut down and clean the molds routinely. Accordingly, it would be desirable to provide an apparatus and method for forming a cover layer on a golf ball without the use of retractable pins.

SUMMARY OF THE INVENTION

The present invention provides, in a first aspect, a golf ball having a plurality of deep dimples defined along an outer surface of the golf ball. The golf ball comprises a core and a cover layer disposed about the core. The cover layer has an outer surface and a thickness and defines a collection of dimples along its outer surface. At least 1%, and more preferably at least 5%, of the dimples have a depth greater than the thickness of the cover layer, and thus extend through the cover layer.

In another aspect, the present invention provides a golf ball comprising a core and a cover layer disposed about the core. The cover layer has a thickness and defines at least two populations of dimples along an outer surface of the cover layer. A first population of dimples includes dimples having a depth greater than the thickness of the cover layer. The second population of dimples includes dimples having a depth less than the thickness of the cover layer. The first population of dimples constitutes at least a minority proportion of the total number of dimples defined along the outer surface of the cover layer.

In yet another aspect, the present invention provides a molding apparatus for forming a golf ball having a cover with a thickness and a plurality of dimples along its outer surface. The molding apparatus comprises a first molding component that defines a hemispherical first mold surface. The first mold surface has at least two populations of outwardly extending projections that form dimples. The populations differ from each other by the height of the projections. The molding apparatus also comprises a second molding component that defines a hemispherical second mold surface. The second mold surface has at least two populations of outwardly extending projections that form the noted dimples. The populations differ from each other by the height of the projections. The second molding component is adapted such that, upon engagement with the first molding component, a generally spherical molding chamber results from the first mold surface and the second mold surface. The molding apparatus also comprises provisions for receiving one or more flowable materials used for forming the golf ball and administering such materials into the molding chamber. At least one population of the outwardly extending projections of the first mold surface and at least one population of outwardly extending projections of the second mold surface have a projection height in the range of from about 0.005 inches to about 0.050 inches.

In a further aspect, the present invention provides a reaction injection molding apparatus for forming a golf ball core or intermediate ball assembly and an outer cover layer disposed about the core or ball assembly. The molding apparatus comprises a first mold defining a hemispherical first mold surface. The molding apparatus also comprises a second mold defining a hemispherical second mold surface. The first and second mold surfaces have a first population of raised regions that form dimples along the cover layer of the golf ball. The first and second mold surfaces also have a second population of raised regions each having a height greater than the thickness of the cover layer of the ball. The molding apparatus also comprises provisions for receiving two or more flowable reactants utilized for forming the outer cover layer. The second population of raised regions constitutes a minority proportion of the total number of dimples along the cover layer.

In yet another aspect, the present invention provides a process for producing a golf ball having a particular proportion of deep dimples along an outer surface of the ball. The process comprises providing a molding apparatus that defines a generally spherical molding chamber resulting from a molding surface having a first population of raised regions that form dimples in the golf ball, and a second population of raised regions that form deep dimples in the golf ball. The process also comprises a step of providing a flowable molding material to the molding apparatus. The process includes another step of positioning a core or intermediate ball assembly in the molding chamber. The process includes a further step of introducing the flowable molding material into the molding chamber between the core or intermediate ball assembly and the molding surface. The process comprises another step of hardening the flowable material to thereby form the golf ball. The second population of the raised regions constitutes at least 5% of the total number of dimples along the outer surface of the ball.

A further aspect of the invention is to provide equipment and methods for forming a golf ball having a dimpled cover that is thinner than traditional cover layers.

Another aspect of the invention is to provide equipment and methods for forming a golf ball having a plurality of dimples in an outer cover layer that extend to, and/or into, at least the next inner layer of the ball.

Still further advantages of the present invention will become apparent to those of ordinary skill in the art upon reading and understanding the following detailed description of the preferred embodiments.

BRIEF DESCRIPTION OF THE DRAWINGS

The following figures are not necessarily to scale, but are merely illustrative of the present invention. Specifically, the figures are for purposes of illustrating various aspects and preferred embodiments of the present invention and are not to be construed as limiting the invention described herein.

DETAILED DESCRIPTION OF THE PREFERRED EMBODIMENTS

Figure 1:
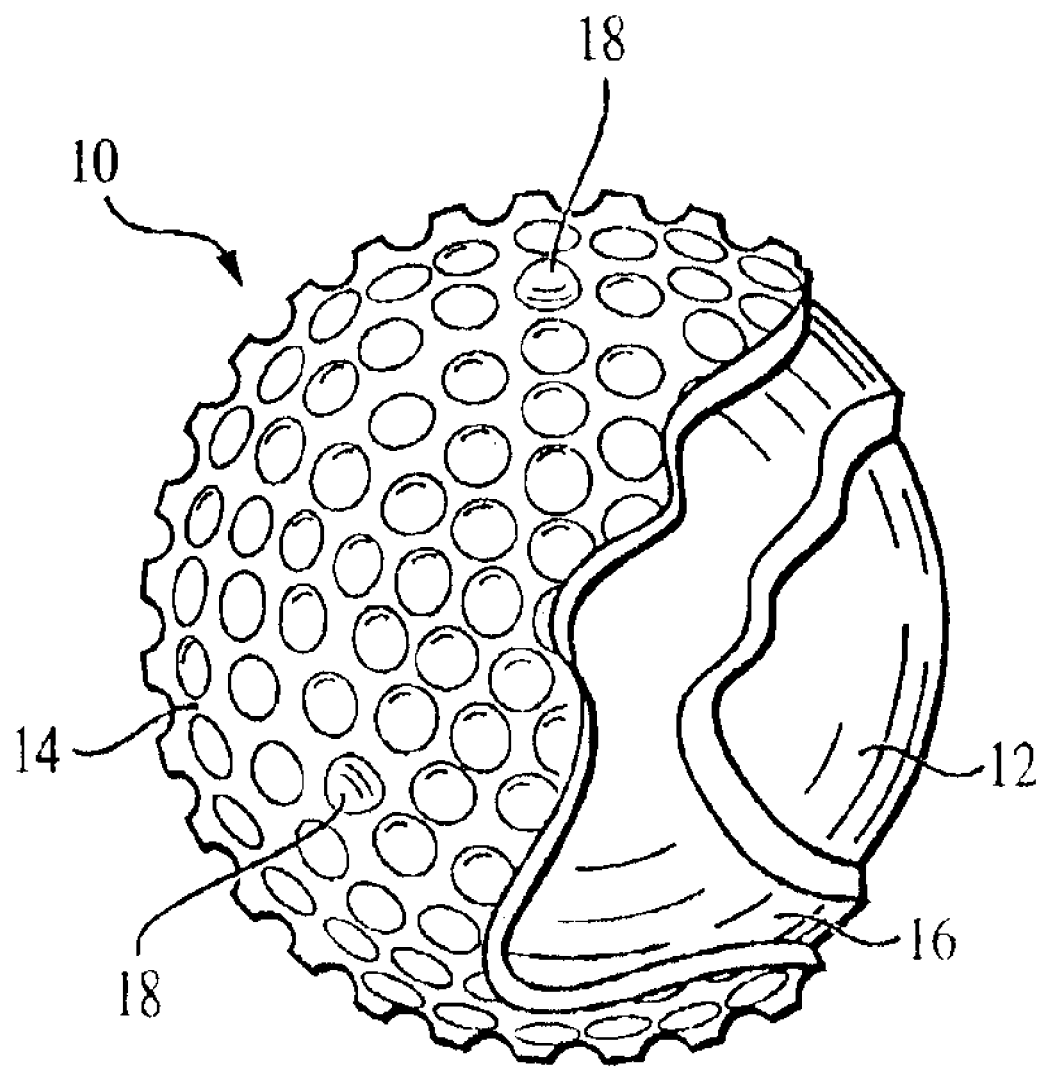
FIG. 1 is a perspective view revealing the components of a preferred embodiment golf ball in accordance with the present invention.

The present invention relates to equipment and methods for producing improved golf balls, particularly a golf ball comprising a cover disposed about a core in which the cover has one or more, preferably a plurality of, deep dimples or apertures that extend through the outer cover to and/or into one or more layers underneath.

The present invention also relates to equipment and methods for producing golf ball assemblies, i.e. cores having one or more mantle or inner cover layers disposed thereon, in which the core or ball assembly includes a plurality of deep dimples. The golf balls of the present invention, which can be of a standard or enlarged size, have a unique combination of cover thickness and dimple configuration. The present invention also relates to forming these golf balls, or at least certain components thereof, by reaction injection molding techniques. Such deep dimples extend through at least one cover layer to, and/or into, the underlying surface or component or layer.

With regard to dimple configuration or cross-sectional geometry, the present invention is based upon the identification of various particularly preferred characteristics as follows. Typically, for circular dimples, dimple diameter is used in characterizing dimple size rather than dimple circumference. The diameter of typical dimples may range from about 0.050 inches to about 0.250 inches. A preferred diameter of a typical dimple is about 0.150 inches. The deep dimples may have these same dimensions or may have dimensions as described in greater detail herein. As will be appreciated, circumference of a dimple can be calculated by multiplying the diameter times p.

The depth of typical dimples previously utilized in the trade may range from about 0.002 inches to about 0.020 inches or as much as 0.050 inches. Preferably, a depth of about 0.010 inches is preferred for typical or conventional dimples. It is preferred that the depth of a deep dimple as described herein is greater than the depth of a typical dimple. Most preferably, the deep dimples have a depth that is deeper than the depth of the typical dimples by at least 0.002 inches.

Specifically, depth of a dimple may be defined in at least two fashions. A first approach is to extend a chord from one side of a dimple to another side and then measure the maximum distance from that chord to the bottom of the dimple. This is referred to herein as a "chordal depth." Alternatively, another approach is to extend an imaginary line corresponding to the curvature of the outer surface of the ball over the dimple whose depth is to be measured. This is referred to herein as a "periphery depth." The latter format of dimple depth determination is used herein unless noted otherwise.

As described herein, the deep dimples included in the present invention are particularly useful when molding certain layers or components about cores or intermediate ball assemblies. The depth of a deep dimple as described herein may range from about 0.002 inches to about 0.140 inches, more preferably from about 0.002 inches to about 0.050 inches, and more preferably from about 0.005 inches to about 0.040 inches. Preferably, a total depth of about 0.025 inches is desired. It is most preferred that the depth of a deep dimple as described herein is greater than the depth of a typical dimple and extend to at least the outermost region of the mantle or core. Alternatively, the deep dimples preferably extend to the bottom of a matched set of dimples on the mantle or the core. The diameter of the deep dimples may be dissimilar, but preferably is the same as other dimples on a ball, and may range from about 0.025 inches to about 0.250 inches and more preferably from about 0.050 inches to about 0.200 inches. A preferred diameter is about 0.150 inches. Generally, depth is measured from the outer surface of a finished ball, unless stated otherwise.

In one embodiment, the present invention relates to an apparatus and technique for forming a golf ball comprising a core and a cover layer, wherein the cover layer provides dimples including one or more deep dimples that extend to or into the next inner layer or component. The cover may be a single layer or comprise multiple layers, such as two, three, four, five or more layers and the like. If the cover is a multi-layer cover, the dimples extend into at least the first inner cover layer, and may extend into a further inner cover layer, a mantle or intermediate layer, and/or the core. If the cover is a single layer, the deep dimples may extend into a mantle layer and/or the core. The cover layer(s) may be formed from any material suitable for use as a cover, including, but not limited to, ionomers, non-ionomers and blends of ionomers and non-ionomers.

In another embodiment, the present invention relates to an apparatus and technique for forming a golf ball comprising a core and a cover layer, wherein the cover layer provides dimples that extend to the core. The golf ball may optionally comprise a thin barrier coating between the core and the cover that limits the transition of moisture to the core. The barrier coating is preferably at least about 0.0001 inches thick. Preferably, the barrier layer is at least 0.003 inches thick. In a two-piece golf ball, a barrier coating is preferably provided between the core and the cover.

In a further embodiment, the present invention relates to equipment and processes for forming a golf ball having a plurality of dimples along its outer surface. In accordance with the present invention, one or more of these dimples are deep dimples that extend entirely through the cover layer of the ball, and to or into one or more underlying components or layers of the ball. For instance, for a golf ball comprising a core and a cover layer disposed about the core, the deep dimples preferably extend through the cover layer and to or into the core. If one or more layers such as an intermediate mantle layer are provided between the core and the cover layer, the deep dimples preferably extend through the cover layer and to or into one or more of those layers. The deep dimples may additionally extend into the core.

The deep dimples of the present invention may be spherical or nonspherical. Additionally, the portion of the deep dimple that extends to, or into the next inner layer or component may be the same or different size and/or shape as the outer portion of the dimple.

Turning now to the drawings, with reference to FIG. 1, a preferred embodiment golf ball 10 in accordance with the present invention is illustrated. The golf ball 10 includes a central core 12 which may be solid or liquid as known in the art. A cover 14 is surroundingly disposed about the central core 12. An intermediate layer 16 may be present between the central core 12 and the cover 14. The present invention primarily relates to the cover 14 and will be described with particular reference thereto, but it is also contemplated to apply to molding of the intermediate layer 16. The preferred embodiment ball 10 includes one or more deep dimples 18 that extend through at least the cover layer 14. The deep dimples 18 extend to, or through, the intermediate layer 16. The deep dimples may further extend into the core 12. It will be appreciated that in the event the core is liquid, the deep dimples will not extend to the core.

As noted, the present invention relates to various molding assemblies and techniques for forming a golf ball having one or more deep dimples along an outer surface of the golf ball. The deep dimples extend through the outermost cover layer of the ball, to or into or through one or more components underneath the outermost cover layer. As explained herein, the deep dimples result from one or more outwardly extending projections or protrusions that are provided in a molding chamber used for molding the final ball. The protrusions generally have a height greater than other raised regions along the molding surface that form conventional dimples along the ball exterior.

Figure 2:
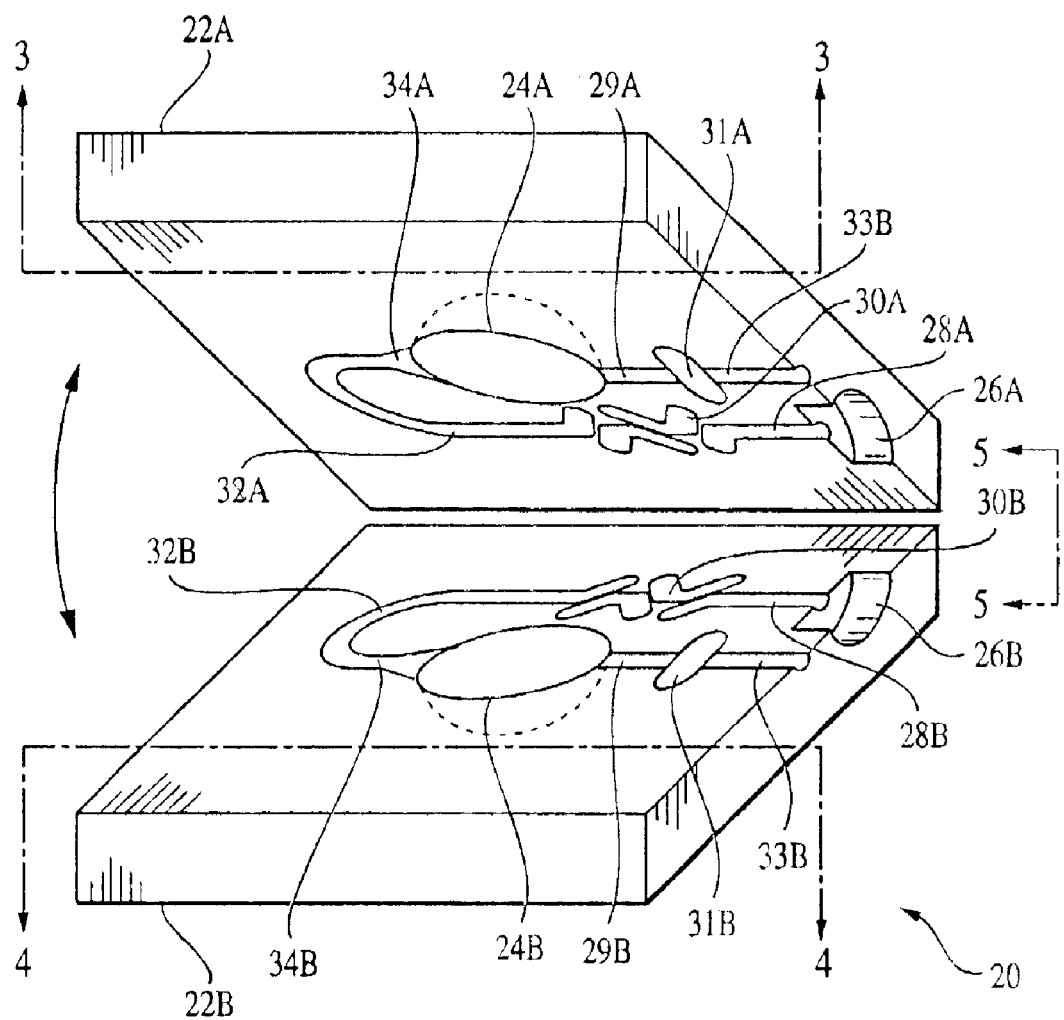
FIG. 2 is a perspective view of a preferred embodiment molding assembly in accordance with the present invention.

Turning now to FIG. 2, a perspective view of a preferred embodiment molding assembly in accordance with the current invention is shown. As previously noted, complete and timely mixing of two or more constituent materials is important when using a RIM process. The preferred embodiment molding assembly 20 provides such mixing as a result of its unique design and configuration. An injection machine, as known in the art, is connected to the preferred embodiment molding assembly 20 which comprises an upper half 22A and a lower half 22B. As will be appreciated, the upper and lower halves 22A and 22B are preferably formed from a metal or suitable material. A mixing chamber may, as known in the art, precede the molding assembly 20 if desired. In a further aspect of the present invention, the molding assembly 20 is utilized as follows. A core 12 (referring to FIG. 1) is positioned within a central cavity formed from two hemispherical depressions 24A and 24B defined in opposing faces of the upper half and lower half 22A and 22B, respectively, of the molding assembly 20. As will be appreciated, when the upper and lower halves 22A and 22B are closed, and the cavities 24A and 24B are aligned with each other, the resulting cavity has a spherical configuration. If the molding assembly is for molding a cover layer, each of the hemispherical cavities 24A and 24B defines a plurality of raised regions that, upon molding a cover layer therein, will result in corresponding dimples on the cover layer.

Each upper and lower half 22A and 22B of the preferred embodiment molding assembly 20 defines an adapter portion 26A and 26B to enable the molding assembly 20 to connect to other process equipment as mentioned above and leads to a material inlet channel 28A and 28B as illustrated in FIG. 2. As will be understood, upon closing the upper and lower halves 22A and 22B of the molding assembly 20, the separate halves of adapter portion 26A and 26B are aligned with each other and create a material flow inlet within the molding assembly. And, each upper and lower half 22A and 22B of the assembly 20 further defines flow channels 28A and 28B, 30A and 30B and 32A and 32B which create a comprehensive flow channel within the molding assembly when the upper and lower halves 22A and 22B are closed. Specifically, the material flow inlet channel portion 28A, 28B receives the constituent materials from the adapter portion 26A and 26B and directs those materials to a turbulence-promoting portion of the channel 30A, 30B which is configured to form at least one fan gate. The upper and lower mold halves 22A and 22B include complimentary turbulence-promoting peanut after-mixer channel portions 30A and 30B, respectively. It will be appreciated that upon closing the upper and lower halves 22A and 22B of the molding assembly 20, the channel portion 30A and 30B defines a region of the flow channel that is generally nonlinear and includes a plurality of bends and at least one branching intersection generally referred to herein as an after-mixer gate. Each after-mixer channel portion 30A, 30B is designed to direct material flow along an angular or tortuous path. As will be described in more detail below, when material reaches a terminus of angular flow in one plane of the flow channel in one half, the material flows in a transverse manner to a corresponding after-mixer channel portion in the opposing half. Thus, when the constituent materials arrive at the after-mixer defined by the channel portion 30A and 30B, turbulent flow is promoted, forcing the materials to continue to mix within the molding assembly 20. This mixing within the molding assembly 20 provides for improved overall mixing of the constituent materials, thereby resulting in a more uniform and homogeneous composition for the cover 14.

Figure 3:
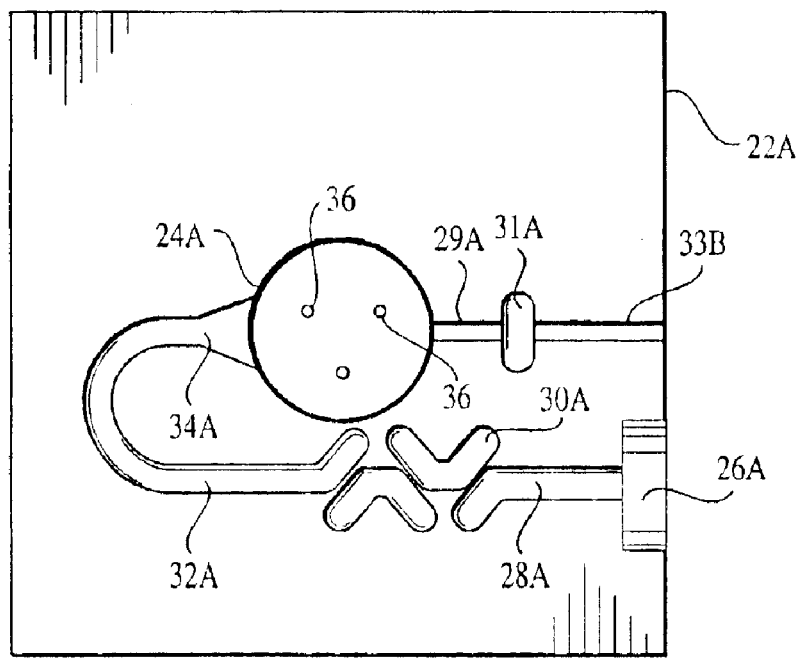
FIG. 3 is a planar view of a portion of the preferred embodiment molding assembly taken in the direction of line 3—3 in FIG. 2.
Figure 4:
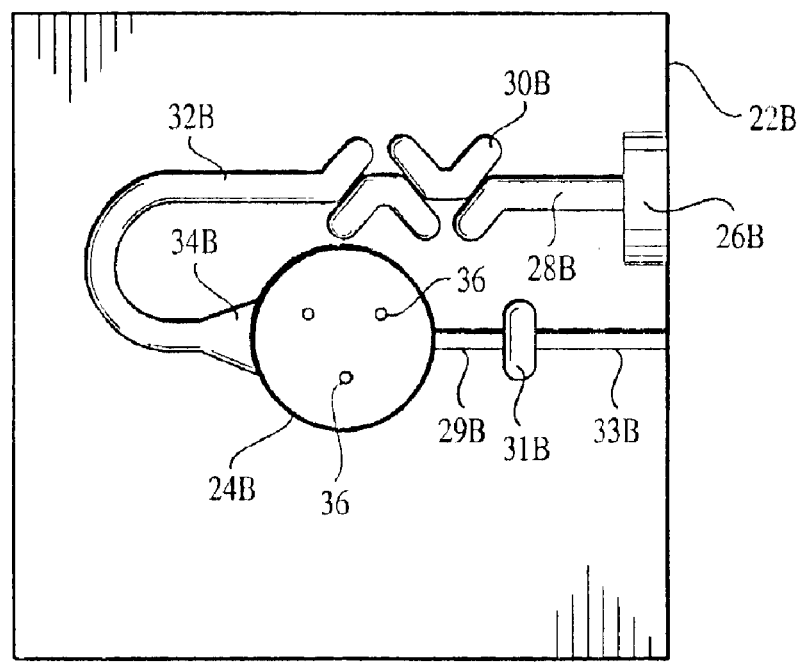
FIG. 4 is a planar view of a portion of the preferred embodiment molding assembly taken in the direction of line 4—4 in FIG. 2.

With continuing reference to FIGS. 3 and 4, views 3—3 and 4—4 from FIG. 2, respectively, are provided. These views illustrate additional details of the present invention as embodied in the mold upper and lower halves 22A and 22B. The material inlet channel 28A and 28B allows entry of the constituents which are subsequently directed through the mix-promoting channel portion 30A and 30B, which forms the after-mixer, then through the connecting channel portion 32A and 32B and to the fan gate portion 34A and 34B which leads into the cavity 24A and 24B. The final channel portion 34A and 34B may be defined in several forms extending to the cavity 24A and 24B, including corresponding or complimentary paths which may be closed (34A) or open (34B) and of straight, curved or angular (34A, 34B) shape.

With continuing reference to FIGS. 3 and 4, at least one protrusion 36 preferably extends into the central cavity 24A and 24B. This at least one protrusion extends from the molding surface into the molding cavity 24A and 24B and supports a golf ball core, such as core 12, or intermediate ball assembly. The preferred dimensions, configuration, and orientation of the protrusion(s) are explained in greater detail herein. It is these protrusion(s) that form one or more deep dimple(s) in the outer surface of a golf ball and which relate to another aspect of the present invention. In typical injection molding, many retractable pins, often four, six or more, are used to centrally position and retain the core 12 in the molding cavity. It has been discovered that because of the reduced process pressure involved in RIM, fewer supporting structures are necessary in the molding assembly 20 to centrally locate the core 12 in the central cavity 24A and 24B. For example, only three protrusions 36 or less may be necessary per mold half. For some embodiments, it is preferred to utilize six protrusions per mold half. The use of fewer supporting structures reduces the cost of the tooling and reduces problems such as defacement and surface imperfections caused by retractable pins. The protrusions 36 are preferably provided at different locations in the molding assembly 20 and extend into different portions of the central cavity formed by the hemispherical cavities 24A, 24B. A channel leading from the cavity 24A and 24B may be provided as either a cavity venting channel or an overflow channel or dump well as known in the art. As shown in FIG. 2, a dump well 31A, 31B is provided in the corresponding molds. A dump well vent 33A, 33B provides communication between the dump well and mold exterior. A venting channel 29A, 29B is defined in the molds and provides communication between the central cavity 24A, 24B and the dump well. It will be appreciated that when the upper and lower halves 22A and 22B are closed, the respective portions of the channel align with one another to form the venting or overflow channel.

Figure 5:
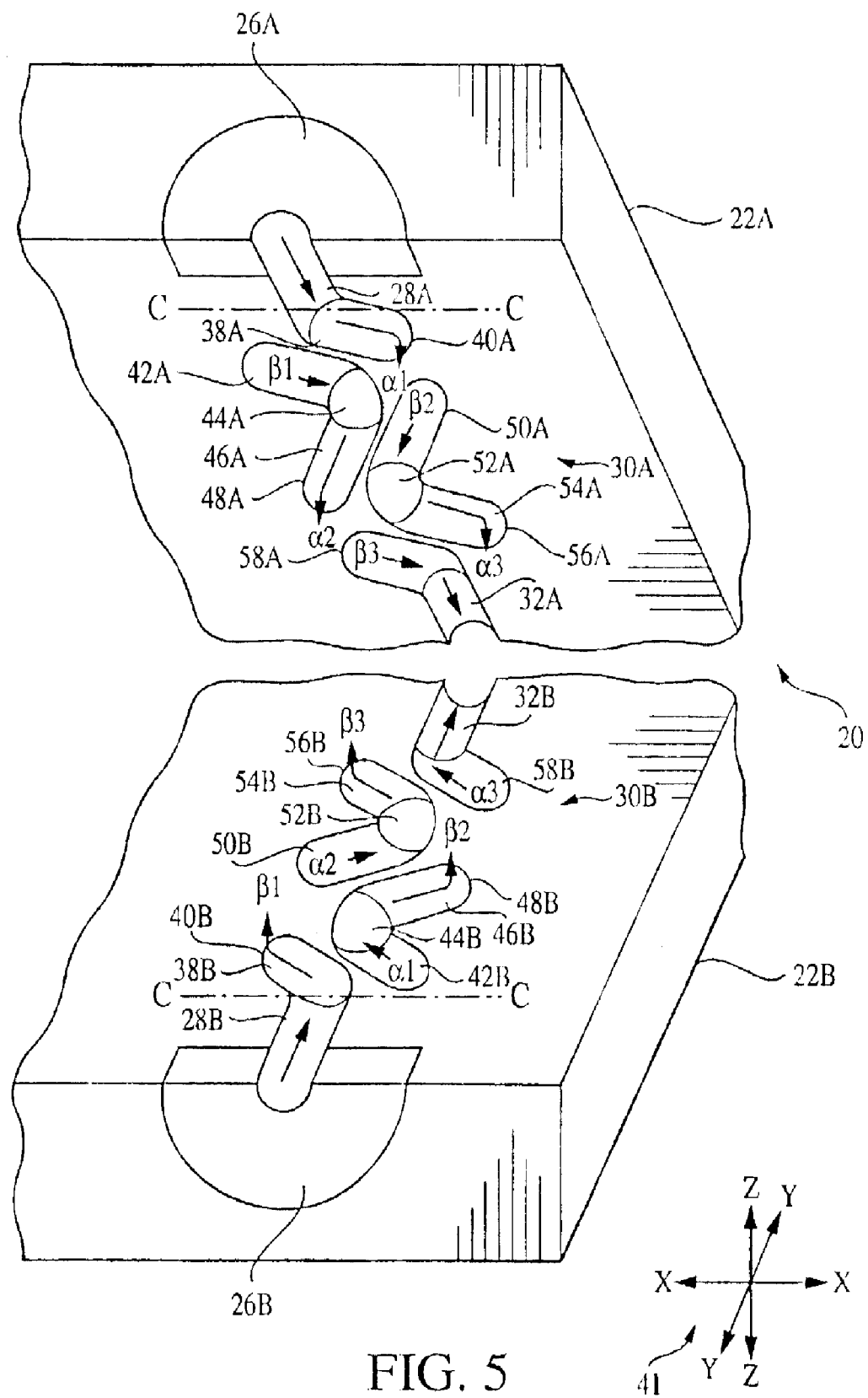
FIG. 5 is a detailed perspective view of a portion of the preferred embodiment molding assembly taken in the direction of line 5—5 in FIG. 2. This view illustrates a mix-promoting peanut after-mixer in accordance with the present invention.

Turning now to FIG. 5, a perspective view of the molding assembly 20 illustrates the details of material flow and mixing provided by the current invention. The body halves 22A and 22B are shown in an open position, i.e., removed from one another, for purposes of illustration only. It will be appreciated that the material flow described below takes place when the halves 22A and 22B are closed. The adapter portion 26A, 26B leads to the inlet flow channel 28A, 28B which typically has a uniform circular cross section of 360°. The flowing material proceeds along the inlet channel 28A, 28B until it arrives in a location approximately at a plane designated by line C—C. At this region, the material is forced to split apart by a branching intersection 38A and 38B. Each half of the branching intersection 38A and 38B is divergent, extending in a direction generally opposing the other half. For example, portion 38A extends upward and 38B extends downward relative to the inlet channel 28A, 28B as shown. Each half of the branching intersection 38A and 38B, in the illustrated embodiment, is semicircular, or about 180° in curvature. The separated material flows along each half of the branching intersection 38A and 38B until it reaches a respective wall, 40A and 40B.

At each first wall 40A and 40B, the material can no longer continue to flow within the plane of the closed mold, i.e., the halves 22A and 22B being aligned with one another. To aid the present description it will be understood that in closing the mold, the upper half 22A is oriented downward (referring to FIG. 5) so that it is generally parallel with the lower half 22B. The orientation of the halves 22A and 22B in such a closed configuration is referred to herein as lying in an x-y plane. As explained in greater detail herein, the configuration of the present invention after-mixer provides one or more flow regions that are transversely oriented to the x-y plane of the closed mold. Hence, these transverse regions are referred to as extending in a z direction.

Specifically, at the first wall 40A the material flows from a point 1 in one half 22A to a corresponding point 1 in the other half 22B. Point 1 in half 22B lies at the commencement of a first convergent portion 42B. Likewise, at the first wall 40B the material flows from a point 1 in one half 22B to a corresponding point 1 in the other half 22A. The point 1 in half 22A lies at the commencement of a first convergent portion 42A. The first convergent portion 42A and 42B brings the material to a first common area 44A and 44B. In the shown embodiment, each first convergent portion is parallel to each first diverging branching intersection to promote a smooth material transfer. For example, the portion 42A is parallel to the portion 38A, and the portion 42B is parallel to the portion 38B.

With continuing reference to FIG. 5, the flowing material arrives at the first common area 44A and 44B, which has a full circular, i.e., 360 degrees, cross section when the halves 22A and 22B are closed. Essentially, the previously separated material is rejoined in the first common area 44A and 44B. A second branching intersection 46A and 46B which is divergent then forces the material to split apart a second time and flow to each respective second wall 48A and 48B. As with the first wall 40A and 40B, the material, upon reaching the second wall 48A and 48B can no longer flow in an x-y plane and must instead move in a transverse z-direction. For example, at the Wall 48A, the material flows from a point "2 in one half 22A to a corresponding point "2 in the other half 22B, which lies in a second convergent portion 50B. The material reaching the wall 48B flows from a point $2 in one half 22B to a corresponding point $2 in the other half 22A, which lies in a second convergent portion 50A.

In the shown embodiment, each second convergent portion 50A and 50B, is parallel to each second diverging branching intersection 46A and 46B. For example, the portion 50A is parallel to the portion 46A and the portion 50B is parallel to the portion 46B. The second convergent portion 50A and 50B forces the material into a second common area 52A and 52B to once again rejoin the separated material. As with the first common area 44A and 44B, the second common area 52A and 52B has a full circular cross section.

After the common area 52A and 52B, a third branching intersection 54A and 54B again diverges, separating the material and conveying it in different directions. Upon reaching each respective third wall, i.e., the wall 56A in the portion 54A and the wall 56B in the portion 54B, the material is forced to again flow in a transverse, z-direction from the planar x-y direction. From a point 3 at the third wall 56A in one half 22A, the material flows to a corresponding point 3 in the other half 22B, which lies in a third convergent portion 58B. Correspondingly, from a point 3 at third wall 56B in one half 22B, the material flows to a corresponding point 3 in the other half 22A, which is in a third convergent portion 58A.

The turbulence-promoting after-mixer structure 30A and 30B ends with a third convergent portion 58A and 58B returning the separated material to the connecting flow channel 32A and 32B. The connecting channel 32A and 32B is a common, uniform circular channel having a curvature of 360 degrees. Once the material enters the connecting channel portion 32A and 32B, typical straight or curved smooth linear flow recommences.

By separating and recombining materials repeatedly as they flow, the present invention provides for increased mixing of constituent materials. Through the incorporation of split channels and transverse flow, mixing is encouraged and controlled while the flow remains uniform, reducing back flow or hanging-up of material, thereby reducing the degradation often involved in non-linear flow. Particular note is made of the angles of divergence and convergence of the after-mixer portions 38A and 38B, 42A and 42B, 46A and 46B, 50A and 50B, 54A and 54B and 58A and 58B, as each extends at the angle of about 30 degrees to 60 degrees from the centerline of the linear inlet flow channel 28A, 28B. This range of angles allows for rapid separation and re-convergence while minimizing back flow. In addition, each divergent branching portion and converging portion 38A and 38B, 42A and 42B, 46A and 46B, 50A and 50B, 54A and 54B and 58A and 58B extends from the centerline of the linear inlet flow channel 28A, 28B for a distance of one to three times the diameter of the channel 28A, 28B before reaching its respective wall 40A and 40B, 48A and 48B and 56A and 56B. Further note is made of the common areas 44A and 44B and 52A and 52B. These areas are directly centered about a same linear centerline which extends from the inlet flow channel portion 28A, 28B to the commencement of the connecting flow channel portion 32A, 32B. As a result, the common areas 44A and 44B and 52A and 52B are aligned linearly with the channel portions 28A, 28B and 32A, 32B, providing for more consistent, uniform flow. While several divergent, convergent, and common portions are illustrated, it is anticipated that as few as one divergent and convergent portion or as many as ten to twenty divergent and convergent portions may be used, depending upon the application and materials involved.

Figure 6:
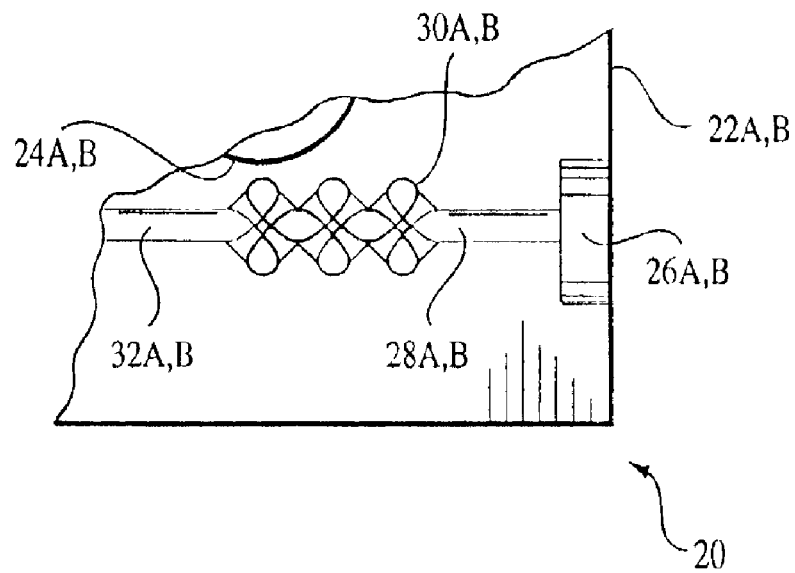
FIG. 6 is a detailed view of the peanut after-mixer of the preferred embodiment molding assembly in accordance with the present invention.

FIG. 6 depicts the turbulence-promoting after-mixer channels 30A, 30B from a side view when the molding assembly 20 is closed. As described above, upon closure, the upper half 22A and the lower half 22B meet, thereby creating the turbulence-promoting after-mixer along the region of the channel portions 30A and 30B. The resulting flow pathway causes the constituent materials flowing therethrough to deviate from a straight, generally linear path to a nonlinear turbulence-promoting path. The interaction and alignment of the divergent branching intersections 38A and 38B, 46A and 46B, 54A and 54B (referencing back to FIG. 5), the convergent portions 42A and 42B, 50A and 50B, 58A and 58B, and the common portions 44A and 44B, and 52A and 52B, also as described above, is shown in detail.

In a particularly preferred embodiment, the after-mixer includes a plurality of bends or arcuate portions that cause liquid flowing through the fan gate to not only be directed in the same plane in which the flow channel lies, but also in a second plane that is perpendicular to the first plane. It is most preferable to utilize an after-mixer with bends such that liquid flowing therethrough travels in a plane that is perpendicular to both the previously noted first and second planes. This configuration results in relatively thorough and efficient mixing due to the rapid and changing course of direction of liquid flowing therethrough.

Figure 7:
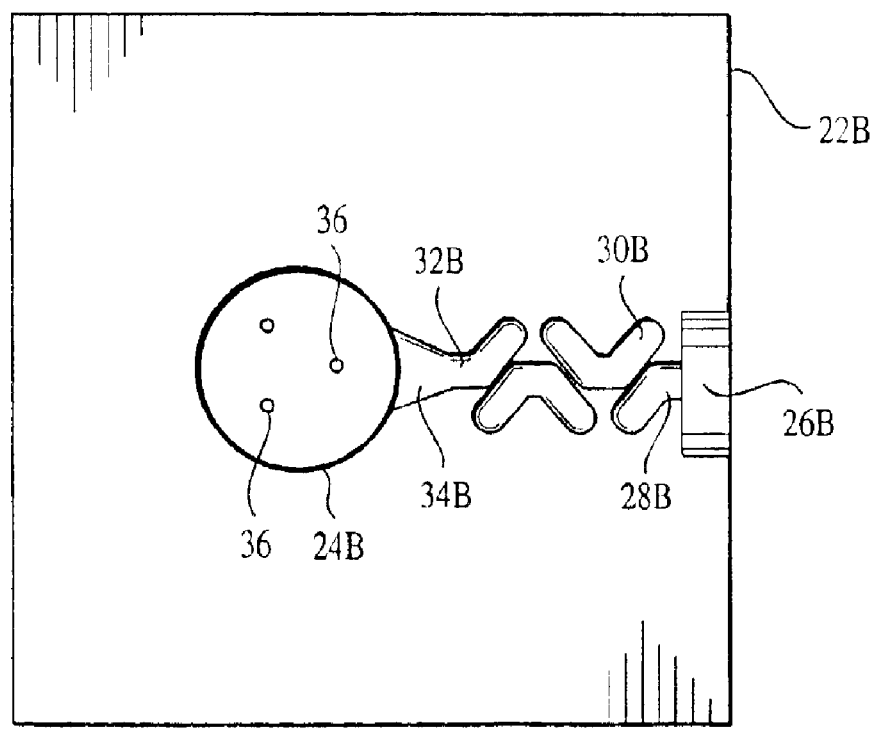
FIG. 7 is a planar view of a portion of an alternative embodiment of the molding assembly in accordance with the present invention.

The configuration of the mold channels may take various forms. One such variation is shown in FIG. 7. Reference is made to the lower mold half 22B for the purpose of illustration, and it is to be understood that the upper mold half 22A (not shown) comprises a complimentary configuration. The adapter portion 26B leads to the inlet flow channel 28B which leads to the turbulence-promoting channel portion 30B. However, instead of the adapter 26B and the channels 28B and 30B being spaced apart from the central cavity 24B, they are positioned approximately in line with the central cavity 24B, eliminating the need for the connecting channel portion 32B to be of a long, curved configuration to reach the fan gate portion 34B. Thus, the connecting channel 32B is a short, straight channel, promoting a material flow path which may be more desirable for some applications. The flow channels and the central cavity may be arranged according to other forms similar to those shown, which may occur to one skilled in the art, as equipment configurations and particular materials and applications dictate. FIG. 7 also illustrates one or more nonretractable protrusions 36 in the molding chamber.

Figure 8:
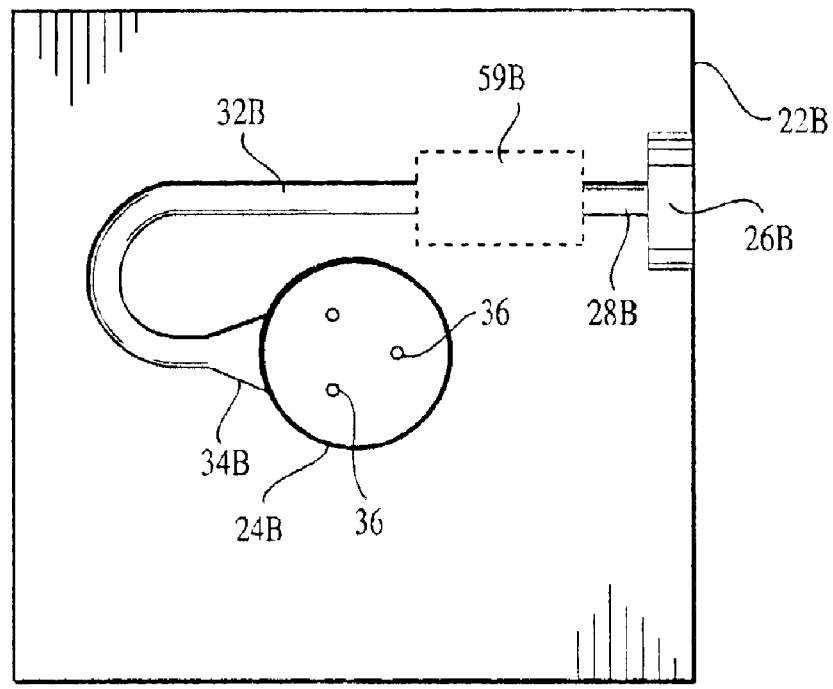
FIG. 8 is a planar view of a portion of an alternative embodiment of the molding assembly in accordance with the present invention.

In the above-referenced figures, the channels 30A and 30B are depicted as each comprising a plurality of angled bends or turns. Turning now to FIG. 8, the channels are not limited to the angled bend-type fan gate configuration and include any turbulence-promoting design located in a region 59B between the adapter portion 26B and the cavity 24B. Again, reference is made to the lower mold half 22B for the purpose of illustration, and it is to be understood that the upper mold half 22A (not shown) is complimentary to the lower mold half 22B. The channels in the turbulence-promoting region 59A (not shown) and 59B could be formed to provide one or more arcuate regions such that upon closure of the upper and lower mold halves 22A and 22B, the flow gate has, for example, a spiral or helix configuration. Regardless of the specific configuration of the channels in the turbulence promoting portion 59A and 59B, the shape of the resulting flow gate insures that the materials flow through the turbulence-promoting region and thoroughly mix with each other, thereby reducing typical straight laminar flow and minimizing any settling in a low-flow area where degradation of flow may occur. Preferably, the shape and configuration of the flow channel is such that the velocity of the materials flowing therethrough is generally constant at different locations along the channel. And, as previously noted, such flow characteristics and thorough mixing of the materials has been found to lead to greater consistency and uniformity in the final physical properties and characteristics of the resulting golf ball layer or component. FIG. 8 further illustrates one or more protrusions 36 in the molding chamber.

Figure 9:
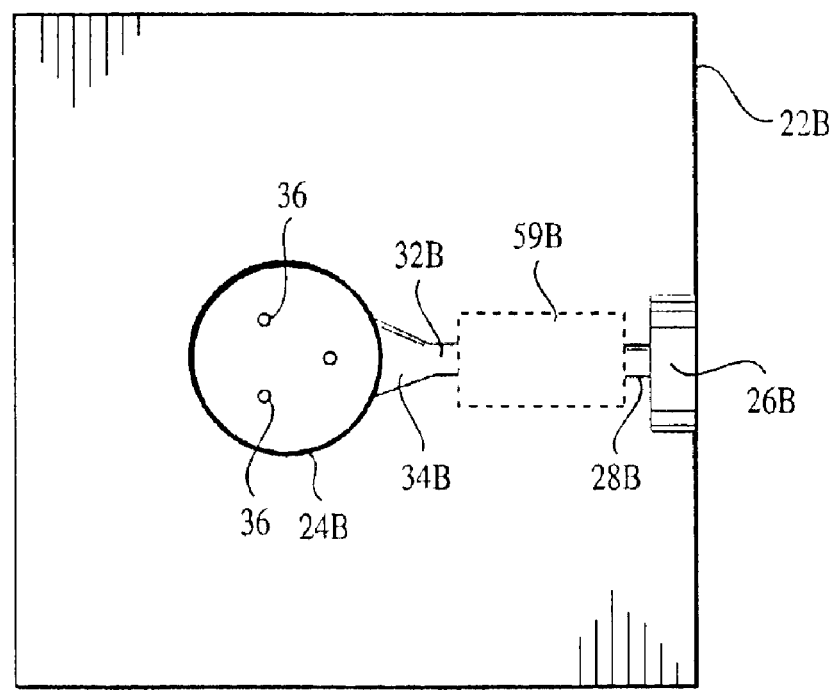
FIG. 9 is a planar view of a portion of an alternative embodiment of the molding assembly in accordance with the present invention.

As shown in FIG. 9, the turbulence-promoting region 59A (not shown) and 59B may be placed in various locations in the upper and lower mold halves 22A (not shown) and 22B. As mentioned above, the turbulence-promoting region 59B and the other flow channel portions 28B, 32B, and 34B may be arranged so as to create an approximately straight layout between the adapter portion 26B and the central cavity 24B. By allowing flexibility in the location of the turbulence-promoting region 59B and the other channel portions 28B, 32B and 34B, as well as the adapter 26B and the central cavity 24B, optimum use may be made of the present invention in different applications. FIG. 9 also illustrates one or more protrusions 36 in the molding chamber.

Gases, including air and moisture, are often present in a RIM process and create undesirable voids in the molded cover 14. Venting of central cavity 24A, 24B reduces voids by removing these gases. Through the use of venting, a cover 14 is provided that is significantly more free from voids or other imperfections than a cover produced by a non-vented RIM process.

Figure 10:
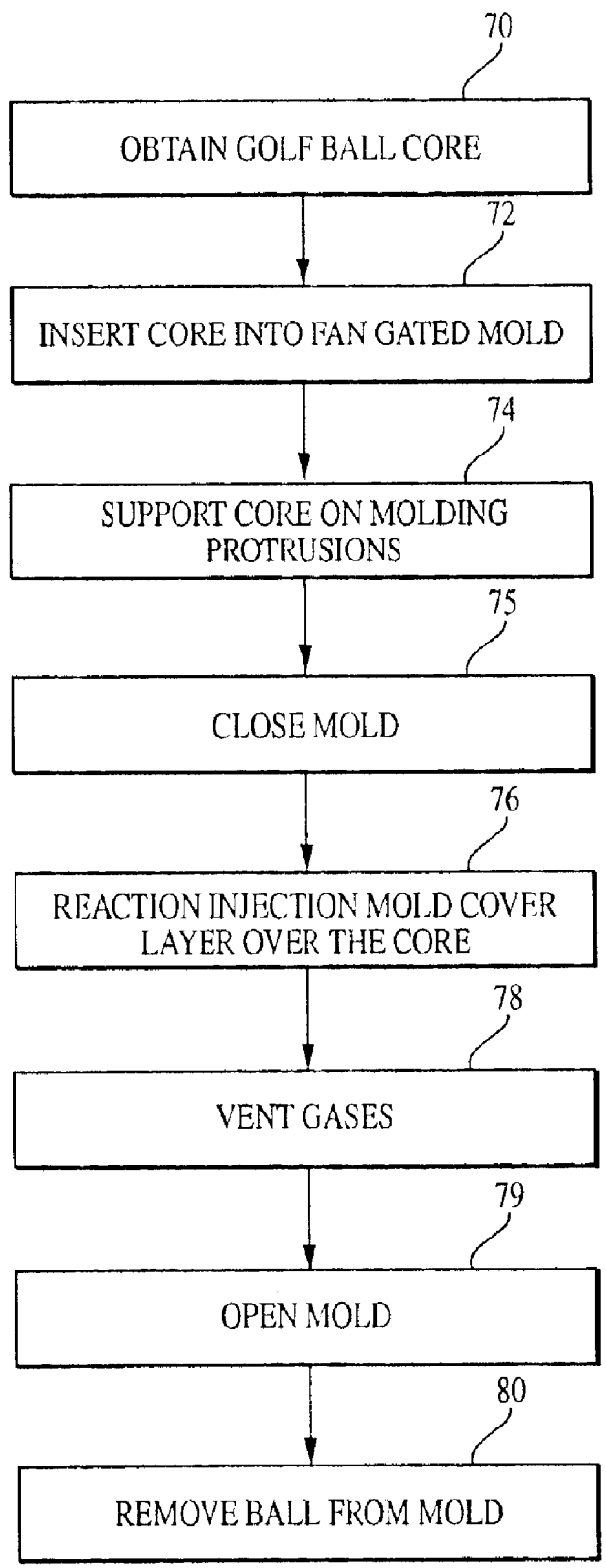
FIG. 10 is a flow chart illustrating a preferred embodiment process in accordance with the present invention.

A preferred method of making a golf ball in accordance with the present invention is illustrated in FIG. 10. A golf ball core 12 made by techniques known in the art is obtained, illustrated as step 70. The core 12 is preferably positioned within a mold having venting provisions, after-mixers, and fan gates as described herein. This is illustrated as step 72. It is preferred that the core 12 is supported on a plurality of the previously described protrusions 36 that form deep dimples in the final ball. This is shown as step 74. The mold is then closed. This is illustrated as step 75. The cover layer 14 is molded over the core 12 by RIM as step 76. If venting of gases from the molding cavity is desired, such gases are preferably vented as previously described. This is designated as step 78. Should increased removal of gases be desired, the venting of step 78 is enhanced by providing a vacuum connection as known in the art to the venting channel. When the molding is complete, the golf ball 10 is removed from the mold, as shown by steps 79 and 80.

In accordance with conventional molding techniques, the preferred embodiment molding processes described herein may utilize one or more mold release agents to facilitate removal of the molded layer or component from the mold.

A golf ball manufactured according the preferred method described herein exhibits unique characteristics. Golf ball covers made through compression molding and traditional injection molding include balata, ionomer resins, polyesters resins and polyurethanes. The selection of polyurethanes which can be processed by these methods is limited. Polyurethanes are often a desirable material for golf ball covers because balls made with these covers are potentially more resistant to scuffing and resistant to deformation than balls made with covers of other materials. The current invention allows processing of a wide array of grades of polyurethane through RIM which was not previously possible or commercially practical utilizing either compression molding or traditional injection molding. It is anticipated that other urethane resins such as Bayer® MP-7500, Bayer® MP-5000, Bayer® aliphatic or light stable resins, and Uniroyal® aliphatic and aromatic resins may be used. For example, utilizing the present invention method and Bayer® MP-10000 polyurethane resin, a golf ball with the properties described below has been provided. Also, depending upon the application, BASF aromatic or aliphatic resins may be used.

Some of the unique characteristics exhibited by a golf ball according to the present invention include a thinner cover without the accompanying disadvantages otherwise associated with relatively thin covers such as weakened regions at which inconsistent compositional differences exist. A traditional golf ball cover typically has a total thickness in the range of about 0.060 inches to 0.080 inches. A golf ball of the present invention may utilize a cover having a thickness of from about 0.002 inches to about 0.100 inches, more preferably from about 0.005 inches to about 0.075 inches, more preferably from about 0.010 inches to about 0.050 inches, and most preferably from about 0.015 inches to about 0.050 inches. This reduced cover thickness is often a desirable characteristic. It is contemplated that thinner layer thicknesses are possible using the present invention.

Because of the reduced pressure involved in RIM as compared to traditional injection molding, an outer cover or any other layer of the present invention golf ball is more dependably concentric and uniform with the core of the ball, thereby improving ball performance. That is, a more uniform and reproducible geometry is attainable by employing the present invention.

The present invention also provides a golf ball in which at least one cover or core layer is a fast-chemical-reaction-produced component. This component comprises at least one material selected from the group consisting of polyurethane, polyurea, polyurethane ionomer, epoxy, and unsaturated polyesters, and preferably comprises polyurethane. The invention also includes a method of producing a golf ball which contains a fast-chemical-reaction-produced component. A golf ball formed according to the invention preferably has a flex modulus in the range of from about 5 to about 310 kpsi, a Shore D hardness in the range of from about 20 to about 90, and good durability. Particularly preferred forms of the invention also provide for a golf ball with a fast-chemical-reaction-produced cover having good scuff resistance and cut resistance. As used herein, "polyurethane and/or polyurea" is expressed as "polyurethane/polyurea".

A particularly preferred form of the invention is a golf ball with a cover comprising polyurethane, the cover including from about 5 to about 100 weight percent of polyurethane formed from recycled polyurethane.

The method of the invention is particularly useful in forming golf balls because it can be practiced at relatively low temperatures and pressures. The preferred temperature range for the method of the invention is from about 50° F. to about 250° F. and preferably from about 120° F. to about 180° F. when the component being produced contains polyurethane. Preferred pressures for practicing the invention using polyurethane-containing materials are 200 psi or less and more preferably 100 psi or less. The method of the present invention offers numerous advantages over conventional slow-reactive process compression molding of golf ball covers. The method of the present invention results in molded covers in a demold time of 10 minutes or less. An excellent finish can be produced on the ball.

The method of the invention also is particularly effective when recycled polyurethane or other polymer resin, or materials derived by recycling polyurethane or other polymer resin, is incorporated into the product.

As indicated above, the fast-chemical-reaction-produced component can be one or more cover and/or core layers of the ball. When a polyurethane cover is formed according to the invention, and is then covered with a polyurethane top coat, excellent adhesion can be obtained. The adhesion in this case is better than adhesion of a polyurethane coating to an ionomeric cover. This improved adhesion can result in the use of a thinner top coat, the elimination of a primer coat, and the use of a greater variety of golf ball printing inks beneath the top coat. These include but are not limited to typical inks such as one component polyurethane inks and two component polyurethane inks.

More specifically, the preferred method of forming a fast-chemical-reaction-produced component for a golf ball according to the invention is by RIM. In this approach, highly reactive liquids are injected into a closed mold, mixed usually by impingement and/or mechanical mixing and secondarily mixed in an in-line device such as a peanut mixer, where they polymerize primarily in the mold to form a coherent, one-piece molded article. The RIM processes usually involve a rapid reaction between one or more reactive components such as polyether—or polyester—polyol, polyamine, or other material with an active hydrogen, and one or more isocyanate—containing constituents, often in the presence of a catalyst. The constituents are stored in separate tanks prior to molding and may be first mixed in a mix head upstream of a mold and then injected into the mold. The liquid streams are metered in the desired weight to weight ratio and fed into an impingement mix head, with mixing occurring under high pressure, e.g., 1500 to 3000 psi. The liquid streams impinge upon each other in the mixing chamber of the mix head and the mixture is injected into the mold. One of the liquid streams typically contains a catalyst for the reaction. The constituents react rapidly after mixing to gel and form polyurethane polymers. Polyureas, epoxies, and various unsaturated polyesters also can be molded by RIM.

As previously noted, RIM differs from non-reaction injection molding in a number of ways. The main distinction is that in RIM a chemical reaction takes place in the mold to transform a monomer or adducts to polymers and the components are in liquid form. Thus, a RIM mold need not be made to withstand the pressures which occur in a conventional injection molding. In contrast, injection molding is conducted at high molding pressures in the mold cavity by melting a solid resin and conveying it into a mold, with the molten resin often being at about 150 to about 350° C. At this elevated temperature, the viscosity of the molten resin usually is in the range of 50,000 to about 1,000,000 centipoise, and is typically around 200,000 centipoise. In an injection molding process, the solidification of the resins occurs after about 10 to 90 seconds, depending upon the size of the molded product, the temperature and heat transfer conditions, and the hardness of the injection molded material. Subsequently, the molded product is removed from the mold. There is no significant chemical reaction taking place in an injection molding process when the thermoplastic resin is introduced into the mold. In contrast, in a RIM process, the chemical reaction typically takes place in less than about 2 minutes, preferably in under one minute, and in many cases in about 30 seconds or less.

If plastic products are produced by combining components that are preformed to some extent, subsequent failure can occur at a location on the cover which is along the seam or parting line of the mold. Failure can occur at this location because this interfacial region is intrinsically different from the remainder of the cover layer and can be weaker or more stressed. The present invention is believed to provide for improved durability of a golf ball cover layer by providing a uniform or seamless cover in which the properties of the cover material in the region along the parting line are generally the same as the properties of the cover material at other locations on the cover, including at the poles. The improvement in durability is believed to be a result of the fact that the reaction mixture is distributed uniformly into a closed mold. This uniform distribution of the injected materials reduces or eliminates knit-lines and other molding deficiencies which can be caused by temperature difference and/or reaction difference in the injected materials. The process of the invention results in generally uniform molecular structure, density and stress distribution as compared to conventional injection-molding processes.

The fast-chemical-reaction-produced component has a flex modulus of from about 1 to about 310 kpsi, more preferably from about 1 to about 100 kpsi, and most preferably from about 2 to about 50 kpsi. The subject component can be a cover with a flex modulus which is higher than that of the centermost component of the cores, as in a liquid center core and some solid center cores. Furthermore, the fast-chemical-reaction-produced component can be a cover with a flex modulus that is higher than that of the immediately underlying layer, as in the case of a wound core. The core can be one piece or multi-layer, each layer can be either foamed or unfoamed, and density adjusting fillers, including metals, can be used. The cover of the ball can be harder or softer than any particular core layer.

The fast-chemical-reaction-produced component can incorporate suitable additives and/or fillers. When the component is an outer cover layer, pigments or dyes, accelerators and UV stabilizers can be added. Examples of suitable optical brighteners which probably can be used include Uvitex? and Eastobrite? OB-1. An example of a suitable white pigment is titanium dioxide. Examples of suitable and UV light stabilizers are provided in commonly assigned U.S. Pat. No. 5,494,291. Fillers which can be incorporated into the fast-chemical-reaction-produced cover or core component include those listed below in the definitions section. Furthermore, compatible polymeric materials can be added. For example, when the component comprises polyurethane and/or polyurea, such polymeric materials include polyurethane ionomers, polyamides, etc.

A golf ball core layer formed from a fast-chemical-reaction-produced material according to the present invention typically contains 0 to 20 weight percent of such filler material, and more preferably 1 to 15 weight percent. When the fast-chemical-reaction-produced component is a core, the additives typically are selected to control the density, hardness and/or COR.

A golf ball inner cover layer formed from a fast-chemical-reaction-produced material according to the present invention typically contains 0 to 60 weight percent of filler material, more preferably 1 to 30 weight percent, and most preferably 1 to 20 weight percent.

A golf ball outer cover layer formed from a fast-chemical-reaction-produced material according to the present invention typically contains 0 to 20 weight percent of filler material, more preferably 1 to 10 weight percent, and most preferably 1 to 5 weight percent.

Catalysts can be added to the RIM polyurethane system starting materials as long as the catalysts generally do not react with the constituent with which they are combined. Suitable catalysts include those which are known to be useful with polyurethanes and polyureas.

The reaction mixture viscosity should be sufficiently low to ensure that the empty space in the mold is completely filled. The reactant materials generally are preheated to about 80° F. to about 200° F. and preferably to 100° F. to about 180° F. before they are mixed. In most cases it is necessary to preheat the mold to, e.g., from about 80° F. to about 200° F., to provide for proper injection viscosity.

As indicated above, one or more cover layers of a golf ball can be formed from a fast-chemical-reaction-produced material according to the present invention.

Figure 11:
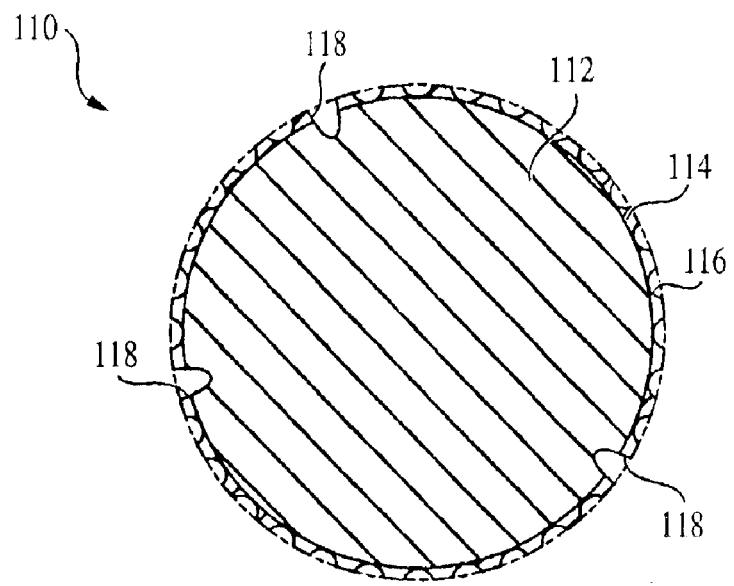
FIG. 11 is a cross-sectional view of another preferred embodiment golf ball according to the present invention having a core and a single cover layer having dimples, wherein one or more of the dimples extends through the cover to and/or into the underlying core.

Referring to FIG. 11, another preferred embodiment golf ball having a cover comprising a RIM polyurethane is shown. The golf ball 110 includes a polybutadiene core 112 and a polyurethane cover 114 formed by RIM. The golf ball 110 defines a plurality of dimples 116 along its outer surface. Preferably, the ball 110 also defines one or more deep dimples 118 as described in greater detail herein.

Figure 12:
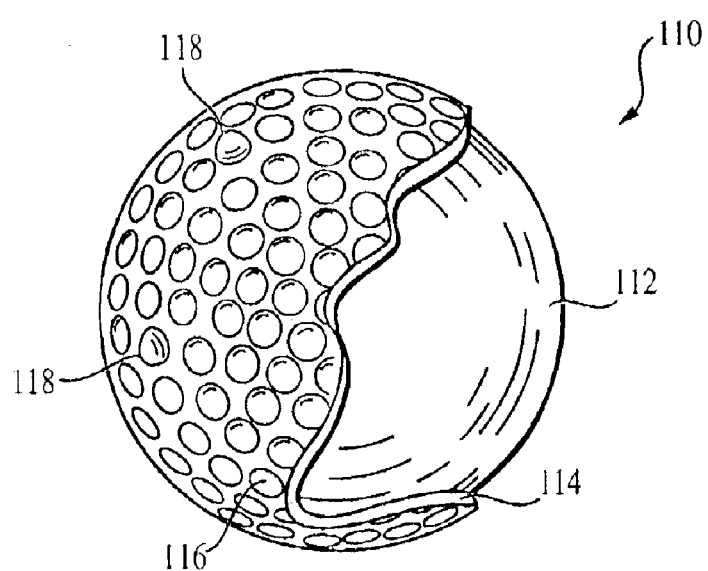
FIG. 12 is a diametrical cross-sectional view of the preferred embodiment golf ball illustrated in FIG. 11.

Referring now to FIG. 12, the golf ball 110 having a core comprising a RIM polyurethane is shown. The golf ball 110 has a RIM polyurethane core 112, and a RIM polyurethane cover 114. The golf ball 110 defines a plurality of dimples 116 along its outer surface. Preferably, the ball 110 also defines one or more deep dimples 118 as described in greater detail herein.

Figure 13:
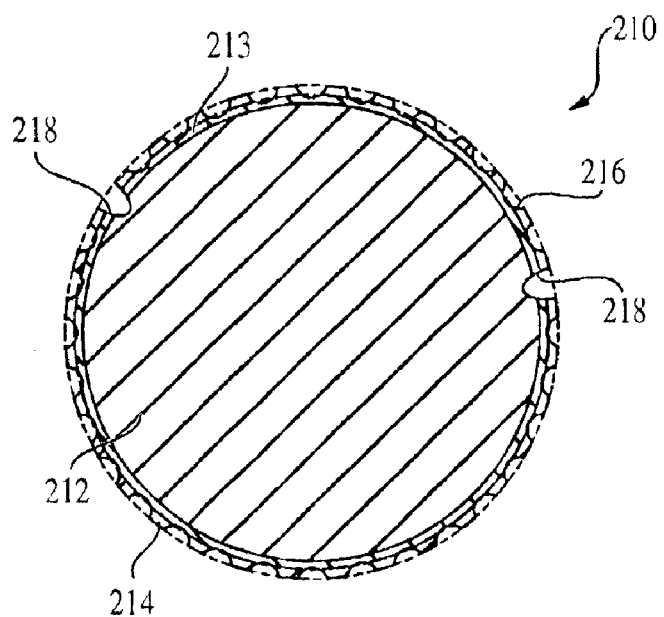
FIG. 13 is a cross-sectional view of another preferred embodiment golf ball according to the present invention having a core component and a cover component, wherein the cover component includes an inner cover layer and an outer cover layer having dimples formed therein, and wherein one or more of the dimples of the outer cover layer extends to and/or into the underlying inner cover layer.
Figure 14:
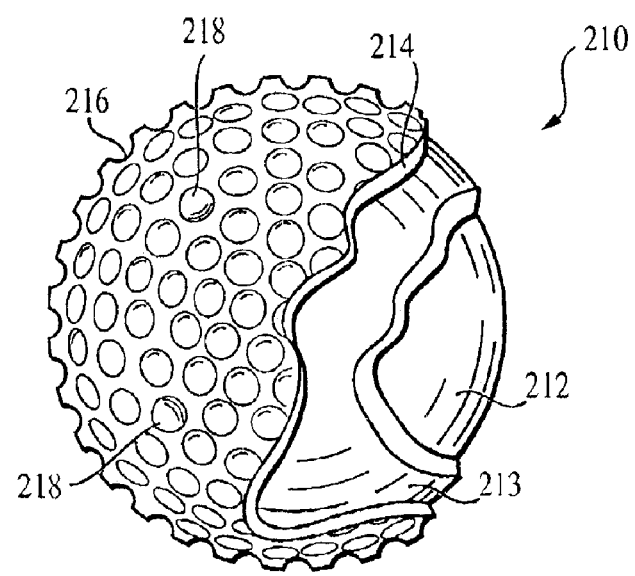
FIG. 14 is a diametrical cross-sectional view of the preferred embodiment golf ball illustrated in FIG. 13.

Referring to FIGS. 13 and 14, a multi-layer golf ball 210 is shown with a solid core 212 containing recycled RIM polyurethane, a mantle cover layer comprising RIM polyurethane 213, and an outer cover layer 214 comprising ionomer or another conventional golf ball cover material. Non-limiting examples of multi-layer golf balls according to the invention with two cover layers include those with RIM polyurethane mantles having a thickness of 0.01 to 0.20 inches, or thinner, and a Shore D hardness of 20 to 80, covered with ionomeric or non-ionomeric thermoplastic, balata or other covers having a Shore D hardness of 20 to 80 and a thickness of 0.010 to 0.20 inches. The golf ball 210 defines a plurality of dimples 216 along its outer surface. Preferably, the ball 210 also defines one or more deep dimples 218 as described in greater detail herein.

Referring again to FIGS. 11 and 12, those figures illustrate a preferred embodiment golf ball 110 produced in accordance with the present invention. One or more of the deep dimples 120, and preferably two or more of the dimples 120, and more preferably three or more of the dimples per hemisphere, extend into the core 112 disposed underneath the cover layer 114. These dimples are herein referred to as deep dimples.

The preferred embodiment golf ball 210 shown in FIGS. 13 and 14 comprises a core 212 having an inner cover layer 213 disposed thereon and an outer cover layer 214 formed about the inner cover layer 213. The cover layers 213 and 214 define a plurality of dimples 216 along the outer surface of the outer cover layer 160. One or more of the dimples, and preferably two or more of the dimples, and more preferably three or more of the dimples per hemisphere, extend entirely through the outer cover layer 214 and at least partially into or to the inner cover layer 213. These dimples, which extend through the outer cover layer, are again referred to herein as deep dimples and shown in FIG. 13 as dimples 218.

The deep dimples can be circular, non-circular, a combination of circular and non-circular, or any other shape desired. They may be of the same or differing shape, such as a circular larger dimple having an oval smaller dimple within the circular dimple, or an oval larger dimple having a circular or other shape within the larger dimple. The dimples do not have to be symmetrical.

Providing deep dimples formed in multiple layers allows the dimple depth to be spread over two or more layers. FIG. 13 illustrates deep dimple 220 formed in both the inner cover layer and the outer cover layer. The inner portion of the dimple 220 is formed in the inner cover layer 213, and the outer portion of the dimple 220 is formed in the outer cover layer 214. For a two-piece ball, dimples may be formed in the core and the single cover layer in the same way as previously described. Additionally, dimples may be formed in more than two cover and/or core layers if desired.

In another preferred embodiment, a multi-layer golf ball is produced that has one or more deep dimples that protrude into the ball through at least one layer, such as an outer cover layer. In a further preferred embodiment, the deep dimple protrudes through at least two layers. The dimples of the at least two layers are configured with the same geometric coordinates (that is, the approximate center of the both dimples would be in the same location, and so the dimples are concentric with respect to each other), producing a golf ball having a dimpled layer over a dimpled layer. This allows for much thinner layers with traditional dimples. The dimples of one or more inner layers may be of varying depths, diameters and radii, yet still aligned with the dimples of the outer layer. This also allows for a dimple within a dimple, where there is a smaller dimple in at least one inner or mantle layer that is within a larger diameter dimple in the outer layer, such as the dimples shown in FIGS. 15 to 18.

FIGS. 15 to 18 illustrate a deep dimple that is a dual radius dimple, or a dimple within a dimple. One advantage of a dual radius dimple is that the deeper part of the dual radius may be filled in with a coating or other material. This provides an effective method for forming dimple depths to a desired value as compared to other methods of dimple formation. The dimple shape may be any shape desired, and each dimple may be the same or different shape. Preferably, the depth of the second or deepest portion of the dual radius dimple may be expressed as a percentage of the total depth of the dimple. Specifically, the region or portion of the dimple which extends to the outermost surface of the ball may be referred to herein as the "major" dimple. And, likewise, the portion of the dimple which extends to the deepest portion or depth of the dimple can be referred to herein as the "minor" dimple. Accordingly, the preferred depth of the major dimple is approximately from about 40% to about 80% of the overall dimple depth. Accordingly, the preferred depth of the minor dimple is approximately 20% to about 60% of the overall dimple depth. The depth being measured from the chord of the major dimple to the bottom of the minor dimple. With regard to diameters, the preferred diameter of the minor dimple is from about 10% to about 70% of the diameter of the major dimple.

Figure 15:
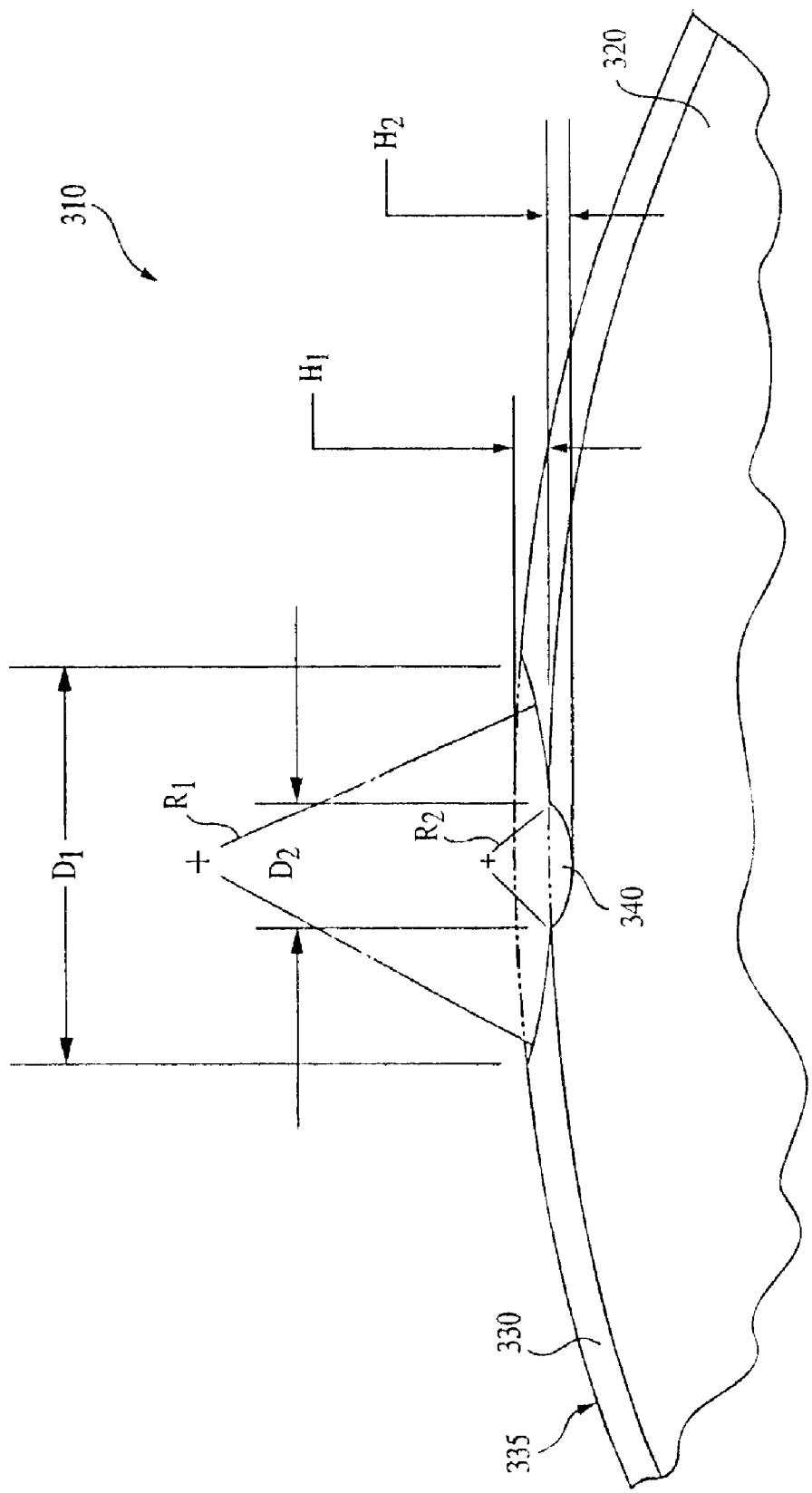
FIG. 15 is a cross-sectional detail view of a portion of another preferred embodiment golf ball according to the present invention having a core and a cover illustrating a dual radius dimple that extends through the cover into the underlying core.

FIG. 15 is a cross-sectional detail illustrating a portion of a preferred embodiment golf ball produced in accordance with the present invention. This preferred embodiment golf ball 310 comprises a core 320 having a cover layer 330 formed thereon. The cover layer defines at least one deep dimple 340 along its outer surface 335. As previously described, it is preferred that one or more (preferably two or more, more preferably three or more per hemisphere) of the dimples extends entirely through the cover layer and into the core disposed underneath the cover layer. FIG. 15 illustrates a deep dimple defined by two different curvatures. Referring to FIG. 15, a first radius $R_1$ defines the portion of the dimple from the outer surface 335 of the golf ball 310 to a point at which the deep dimple extends into a layer underneath the cover layer. At this point, the curvature of the dimple changes and is defined by radius $R_2$. Preferably, $R_1$, is from about 0.130 inches to about 0.190 inches, and most preferably, $R_1$, is from about 0.140 to about 0.180 inches. For some embodiments, $R_1$ ranges from about 0.100 inches to about 1.000 inch, and most preferably from about 0.200 inches to about 0.800 inches. Preferably, $R_2$ is from about 0.025 inches to about 0.075 inches, and most preferably, $R_2$ is about 0.050 to about 0.065 inches. For some embodiments, $R_2$ ranges from about 0.002 inches to about 0.500 inches, and most preferably from about 0.010 inches to about 0.200 inches. The overall diameter or span of the dimple 340 is designated herein as $D_1$. The diameter or span of the portion of the dimple that extends into the layer underneath the outer cover layer is designated herein as $D_2$. Preferably, $D_1$ is from about 0.030 inches to about 0.250 inches, more preferably from about 0.100 inches to about 0.186 inches, and most preferably, $D_1$ is about 0.146 inches to about 0.168 inches. For some embodiments, $D_1$ ranges from about 0.100 inches to about 0.250 inches, and most preferably $D_1$ is about 0.140 inches to about 0.180 inches. Preferably $D_2$ is from about 0.020 inches to about 0.160 inches, more preferably from about 0.030 inches to about 0.080 inches, and most preferably, $D_2$ is about 0.056 inches. For some embodiments, $D_2$ is from about 0.040 inches to about 0.060 inches. Accordingly, the overall depth of the deep dimple portion that is defined by $R_1$ is designated herein as $H_1$ and the depth or portion of the dimple that is defined by $R_2$ is designated herein as $H_2$. Preferably, $H_1$ is from about 0.005 inches to about 0.135 inches, more preferably from about 0.005 to about 0.025 inches, more preferably from about 0.010 inches to about 0.015 inches, and most preferably, $H_1$ is about 0.015 inches. For some embodiments, $H_1$ is from about 0.005 inches to about 0.015 inches. $H_2$ may range from about 0.005 inches to about 0.135 inches, and more preferably from about 0.005 to about 0.050 inches. Preferably, $H_2$ ranges from about 0.005 inches to about 0.030 inches and is about 0.010 inches. For some embodiments, $H_2$ is from about 0.005 inches to about 0.015 inches.

Figure 16:
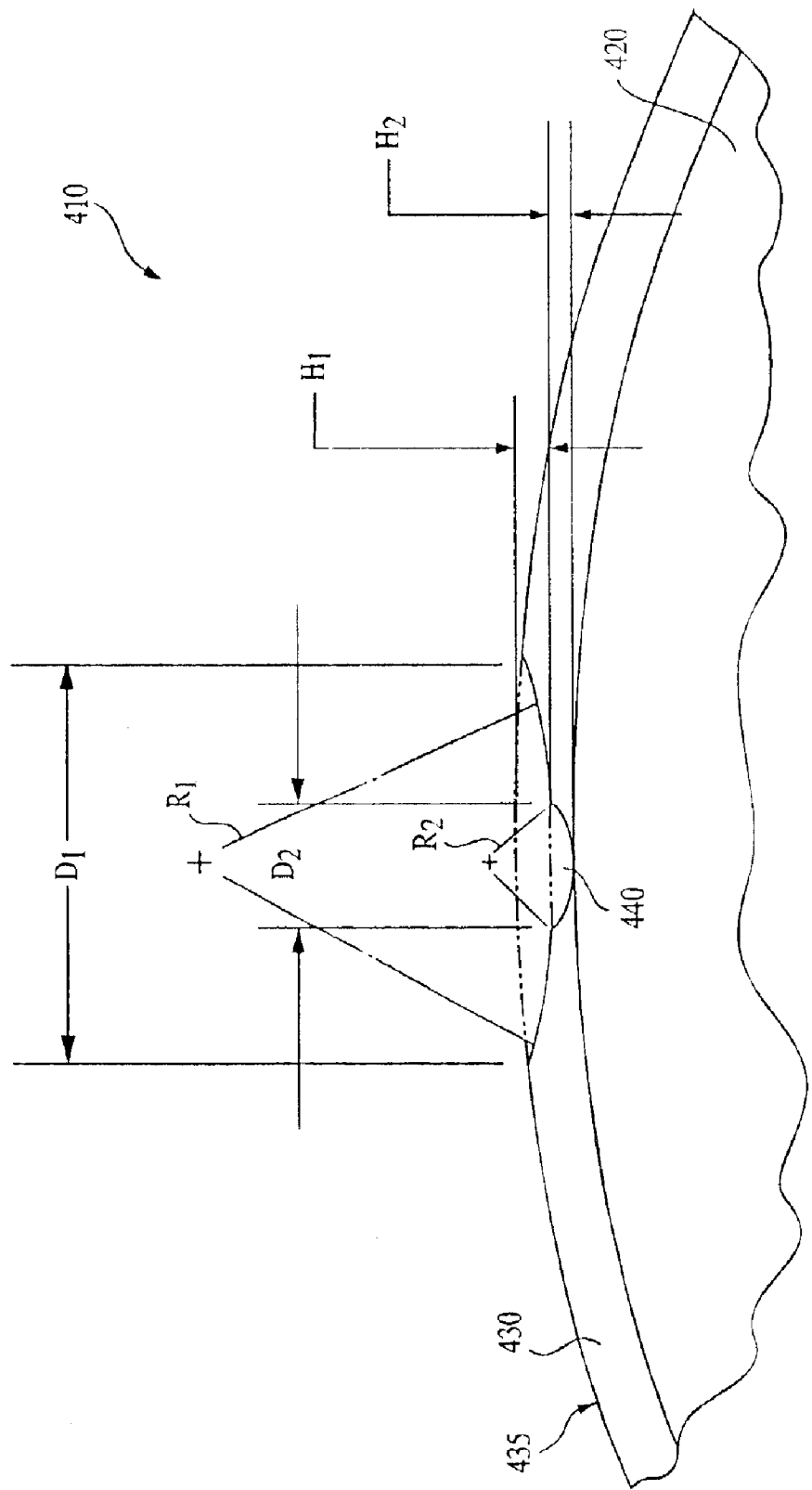
FIG. 16 is a cross-sectional detail view of a portion of another preferred embodiment golf ball according to the present invention having a core and a cover illustrating a dual radius dimple that extends through the outer cover layer to the outer surface of the core.

Referring to FIG. 16, another preferred embodiment golf ball 410 is illustrated. In this version of the present invention, a golf ball 410 comprises a core 420 and a cover layer 430 formed thereon. The cover layer 430 defines at one deep dimple 440 along the outer surface 435 of the golf ball 410. As can be seen, the dimple 440 is defined by two different curvatures, each of which is defined by radii $R_2$ and $R_1$ as previously described with respect to FIG. 15. The other parameters $D_1$, $D_2$, $H_1$, and $H_2$ are as described with respect to FIG. 15. FIG. 16 illustrates an embodiment in which the dimple 440 extends to the core 420 and not significantly into the core. In contrast, the version illustrated in FIG. 15 is directed to a dimple configuration in which a dimple extends significantly into the underlying core.

Figure 17:
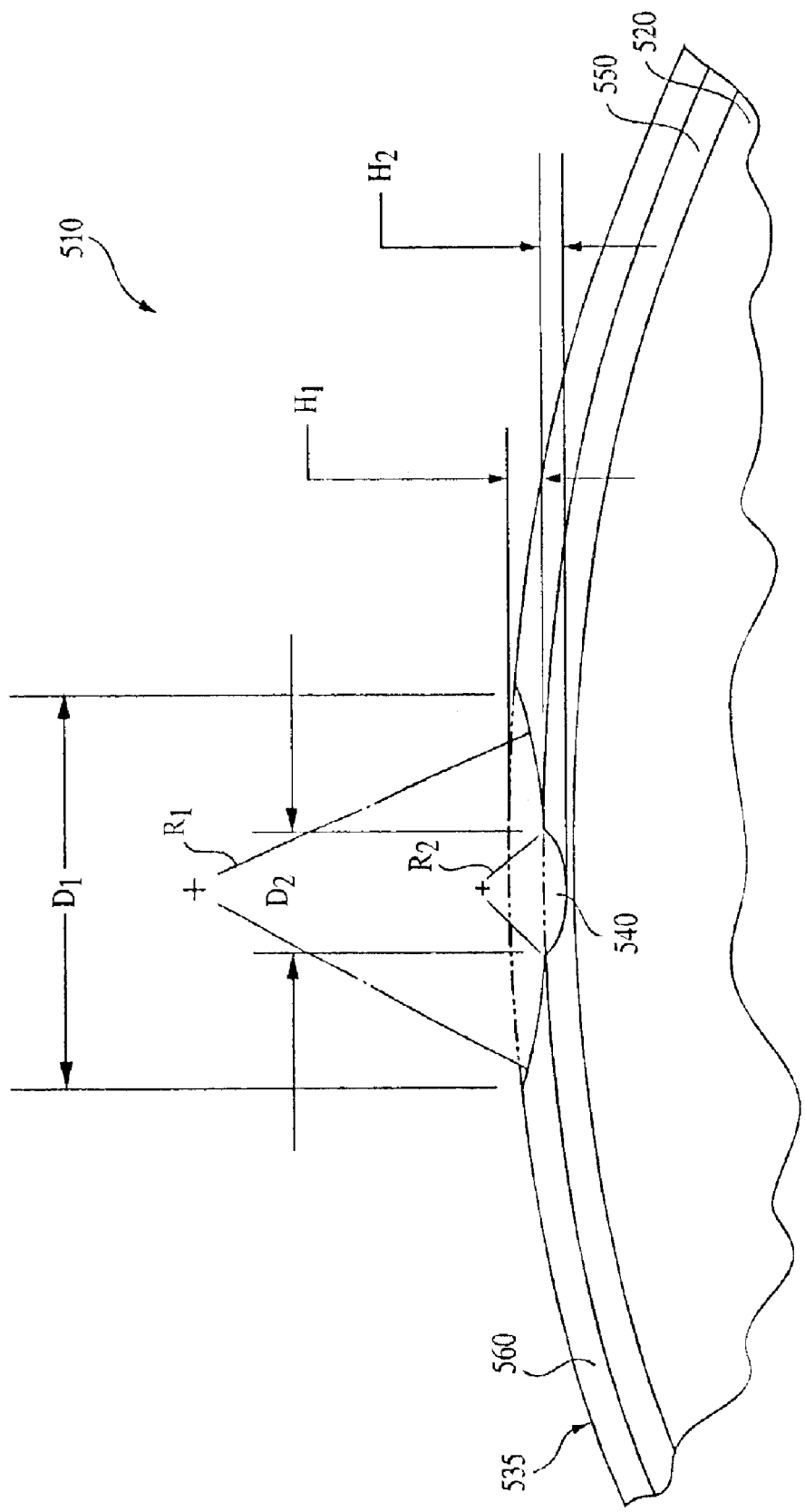
FIG. 17 is a cross-sectional detail view of a portion of another preferred embodiment golf ball according to the present invention having a core, an inner cover layer, and an outer cover layer, wherein the outer cover layer has a dual radius dimple that extends into the inner cover layer.

FIG. 17 illustrates a preferred embodiment golf ball 510 comprising a core 520, a mantle or inner cover layer 550, and an outer cover layer 560. The outer cover layer 560 and inner cover layer 550 define at least one deep dimple 540 along the outer surface 535 of the ball 510. The dimple 540 is defined by two different regions or two curvatures, each of which is in turn defined by radii $R_2$ and $R_1$. The other parameters $D_1$, $D_2$, $H_1$, and $H_2$ are as described with respect to FIG. 15. As can be seen in FIG. 17, the dimple 540 extends entirely through the outer cover layer 560 and into the inner cover layer or mantle layer 550.

Figure 18:
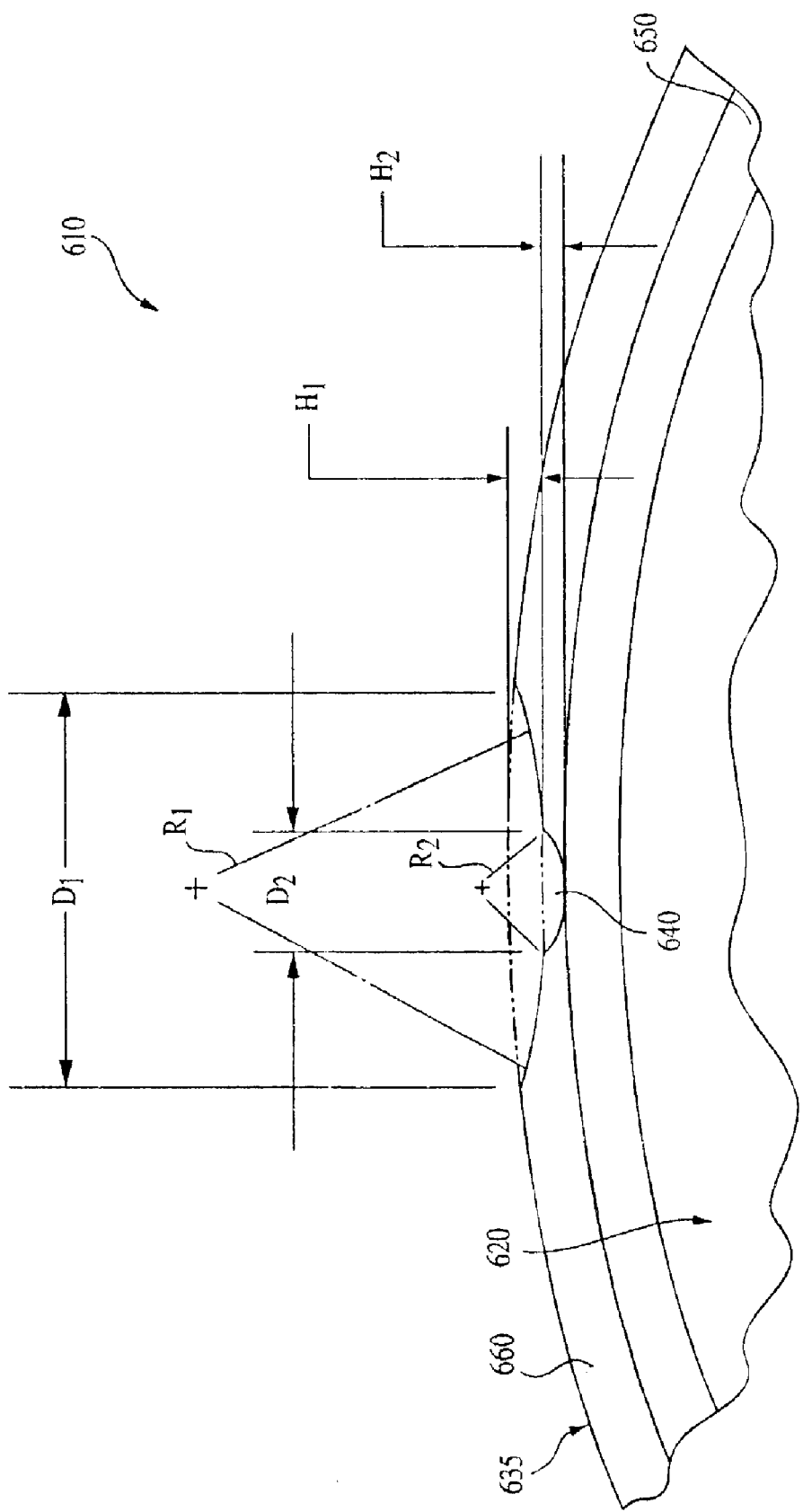
FIG. 18 is a cross-sectional detail view of a portion of another preferred embodiment golf ball according to the present invention having a core, an inner cover layer, and an outer cover layer illustrating a dual radius dimple that extends through the outer cover layer to the inner cover layer of the ball.

FIG. 18 illustrates another preferred embodiment golf ball 610 in accordance with the present invention. The golf ball 610 comprises a core 620 having disposed thereon an inner cover layer or mantle layer 650 and an outer cover layer 660. Defined along the perimeter or outer periphery of the ball 610 is at least one deep dimple 640. The dimple 640 is defined along the outer surface 635 of the ball 610. The dimple 640 has two different regions or curvatures each defined by radii $R_2$ and $R_1$. The other parameters $D_1$, $D_2$, $H_1$, and $H_2$ are as described with respect to FIG. 15. The version illustrated in FIG. 18 reveals a dimple 640 that does not significantly extend into the mantle layer or inner cover layer 650. Instead, the dimple 640 only extends to the outermost region of the mantle layer or inner cover layer 650.

An important characteristic of dimple configuration is the volume ratio. The volume ratio is the sum of the volume of all dimples taken below a chord extending across the top of a dimple, divided by the total volume of the ball. The volume ratio is a critical parameter for ball flight. A high volume ratio generally results in a low flying ball. And a low volume ratio often results in a high-flying ball. A preferred volume ratio is about 1%. The balls of the present invention however may be configured with greater or lesser volume ratios.

The number and/or layout of dimples will not necessarily change the coverage, i.e. surface area. A typical coverage for a ball of the present invention is about 60% to about 90% and preferably about 83.8%. In other embodiments, this preferred coverage is about 84% to about 85%. These percentages are the percent of surface area of the ball occupied by dimples. It will be appreciated that the present invention golf balls may exhibit coverages greater or less than that amount.

For configurations utilizing dimples having two or more regions of different curvature, i.e. dimple within a dimple, there is less impact on the volume ratio than the use of deep dimples. If there are enough of either dimples within dimples or deep dimples, the aerodynamics of the ball will eventually be impacted.

The optimum or preferred number of deep dimples utilized per ball varies. It is the amount necessary to secure or center the core or core and cover layer(s) during molding without adversely affecting the aerodynamics of the finished ball. However, the present invention includes the use of a relatively large number of deep dimples. That is, although most of the focus of the present invention is directed to the use of only a few deep dimples per golf ball, i.e. from 2 to 6, the invention includes the use of a significantly greater number such as from about 50 to about 250. It is also contemplated that for some applications, it may be desirable to form all, or nearly all, dimples on a golf ball as deep dimples such as, for example, from about 50 to about 500.

In certain golf ball embodiments, it may be desirable to form a particular proportion of the dimples along the outer surface of the golf ball as deep dimples. The proportion selected may depend upon aesthetics, aerodynamic effects, marketability factors, ball performance, manufacturing, or other factors. Generally, the proportion of dimples that may be formed as deep dimples may be all, substantially all, a majority, half, a minority, or a minor number.

More specifically, in certain embodiments, it is desirable to form a specific proportion of all dimples along the outer surface of a golf ball as deep dimples. For instance, it may be desirable to form all dimples, i.e. 100%, as deep dimples. In other embodiments, it may be desirable to form at least 95% of all dimples as deep dimples. Or, it may be desirable to form at least 90% of all dimples as deep dimples. Alternatively, it may be desirable to form at least 85%, at least 80%, at least 75%, at least 70%, at least 65%, at least 60%, at least 55%, at least 50%, at least 45%, at least 40%, at least 35%, at least 30%, at least 25%, at least 20%, at least 15%, at least 10%, at least 5%, or at least 1% as deep dimples.

In forming golf balls with a particular number of deep dimples, it will be appreciated that the molding equipment employed to form such balls utilizes a molding chamber having a molding surface with a corresponding number of outwardly extending protuberances or projections as described herein.

Furthermore, the processes and equipment described herein for reaction injecting molding a polyurethane or polyurethane derivative material, are well suited for forming a golf ball with a relatively large proportion of deep dimples. Although not wishing to be bound to any particular theory or limiting reason, it is believed that the mixing and molding characteristics of the molding material and that associated with the process and equipment, enable and promote the formation of one or more cover layers that define a large number of well defined deep dimples.

One particularly preferred embodiment golf ball includes multiple populations of dimples along its outer surface. For example, two, three, four, five, six or more different types or populations of dimples may be provided. One or more of the multiple populations are preferably deep dimples. The other populations may include a wide array of dimple types such as, but not limited to, conventional dimples, non-conventional dimples, or dimples known in the prior art.

In general, as dimples are made deeper, the ball will fly lower as compared to the use of dimples that are shallower. As the number of deep dimples increases, the ball will exhibit a lower flight trajectory. Accordingly, the preferred approach is to utilize a smaller number of deep dimples. However, for other applications, the present invention includes a ball with many deep dimples.

The overall shape of the dimples, including deep dimples, may be nearly any shape. For example, shapes such as hexagon, pentagon, triangle, ellipse, circle, etc. are all suitable. There is no limit to the number of shapes, although some shapes are preferred over others. At present, circular dimples are preferred. As for the cross-sectional configuration, the dimples may utilize any geometry. For instance, dimples may be defined by a constant curve or a multiple curvature or dual radius configuration or an elliptical or teardrop shaped region.

Figure 19:
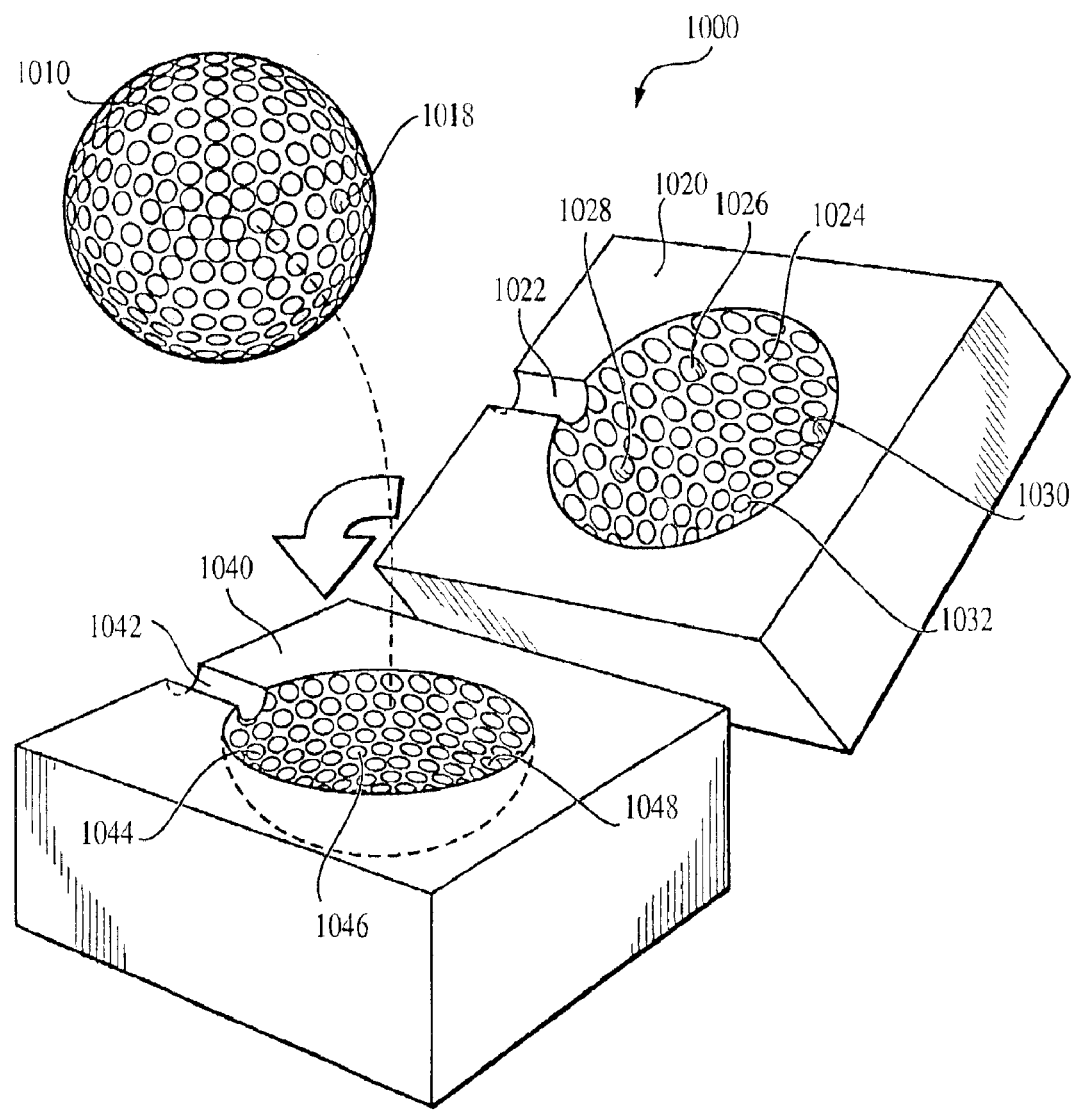
FIG. 19 is a schematic view of a preferred embodiment molding assembly and a golf ball core according to the present invention.

FIG. 19 illustrates a preferred embodiment molding apparatus 1000 in accordance with the present invention. Molding apparatus 1000 comprises two mold halves 1020 and 1040 that each define a hemispherical portion of a molding chamber 1024 and 1044. Defined along the outer surface of the hemispherical portion of the molding chamber 1024 are a plurality of raised protrusions or support pins 1032. These raised regions or support pins form dimples in a cover layer in a golf ball formed using molding apparatus 1000. Also provided along the outer surface of the hemispherical molding chamber 1024 are a plurality of outwardly extending or raised regions or support pins 1026, 1028, and 1030. These raised regions are of a height greater than the height of the raised regions 1032. Specifically, the raised regions 1026, 1028, and 1030 form deep dimples as described herein. These raised regions are used to retain and support a golf ball core placed in the mold. These raised regions also serve to form deep dimples 1018 in the golf ball 1010. A passage 1022 is provided in the mold half 1020 as will be appreciated. The passage 1022 provides communication and a path for a flowable moldable material to be introduced into the molding chamber. The molding apparatus 1000 also includes a second molding portion or plate 1040. The plate 1040 defines a hemispherical molding chamber 1044 also having a plurality of raised regions or support pins along its outer surface. Specifically, raised regions 1046 and 1048 are provided similar to the previously described raised regions 1026, 1028, and 1030. The molding plate 1040 also defines a channel 1042 extending from the molding chamber 1044 to the exterior of the plate. Most preferably, the molding channel 1042 is aligned with channel 1022 in the other plate 1020 when the mold is closed to provide a unitary passage providing communication between the molding chamber and the exterior of the mold. It will be appreciated that this figure is not necessarily to scale, and so channel 1042 would likely be significantly smaller in a commercial manufacturing application. Preferably, a turbulence-inducing aftermixer is provided in the mold halves as previously described in conjunction with FIGS. 2–9. Similarly, provisions for a dump well and associated venting are also provided as previously described. A golf ball core placed in the molding chamber 1024, 1044 is supported by the various raised regions 1026, 1028, 1030, 1046, and 1048 as previously described. Upon molding a suitable cover layer on the core or intermediate ball assembly, the golf ball 1010 is produced.

Certain preferred embodiment molding equipment in accordance with the present invention utilize molds with molding surfaces that provide a collection of different types or heights of raised regions or outwardly extending projections. Specifically, it may in some instances be desirable to provide a molding surface with a first population of raised regions that define a first type of dimple and another population of raised regions that define deep dimples as described herein. The second or other population of raised regions that form deep dimples may constitute a minority proportion or a majority proportion of all the dimples defined on the resulting golf ball. It is also contemplated to provide a number of different shapes, sizes, heights, and configurations or raised regions along a molding surface. As will be appreciated, this is an efficient manner to form a golf ball with a relatively large number of deep dimples.

Additionally, golf balls of the present invention that comprise polyurethane/polyurea (or other suitable materials) in any of the inner and outer cover layer may be produced by RIM, as previously described.

Golf balls and, more specifically, cover layers formed by RIM are preferably formed by the process described in application Ser. No. 09/040,798, filed Mar. 18, 1998, incorporated herein by reference, or by a similar RIM process.

The golf balls, and particularly the cover layer(s), of the present invention may also be formed by liquid injection molding (LIM) techniques, or any other method known in the art.

The golf balls formed according to the present invention can be coated using a conventional two-component spray coating or can be coated during the RIM process, for example, using an in-mold coating process.

Figure 20:
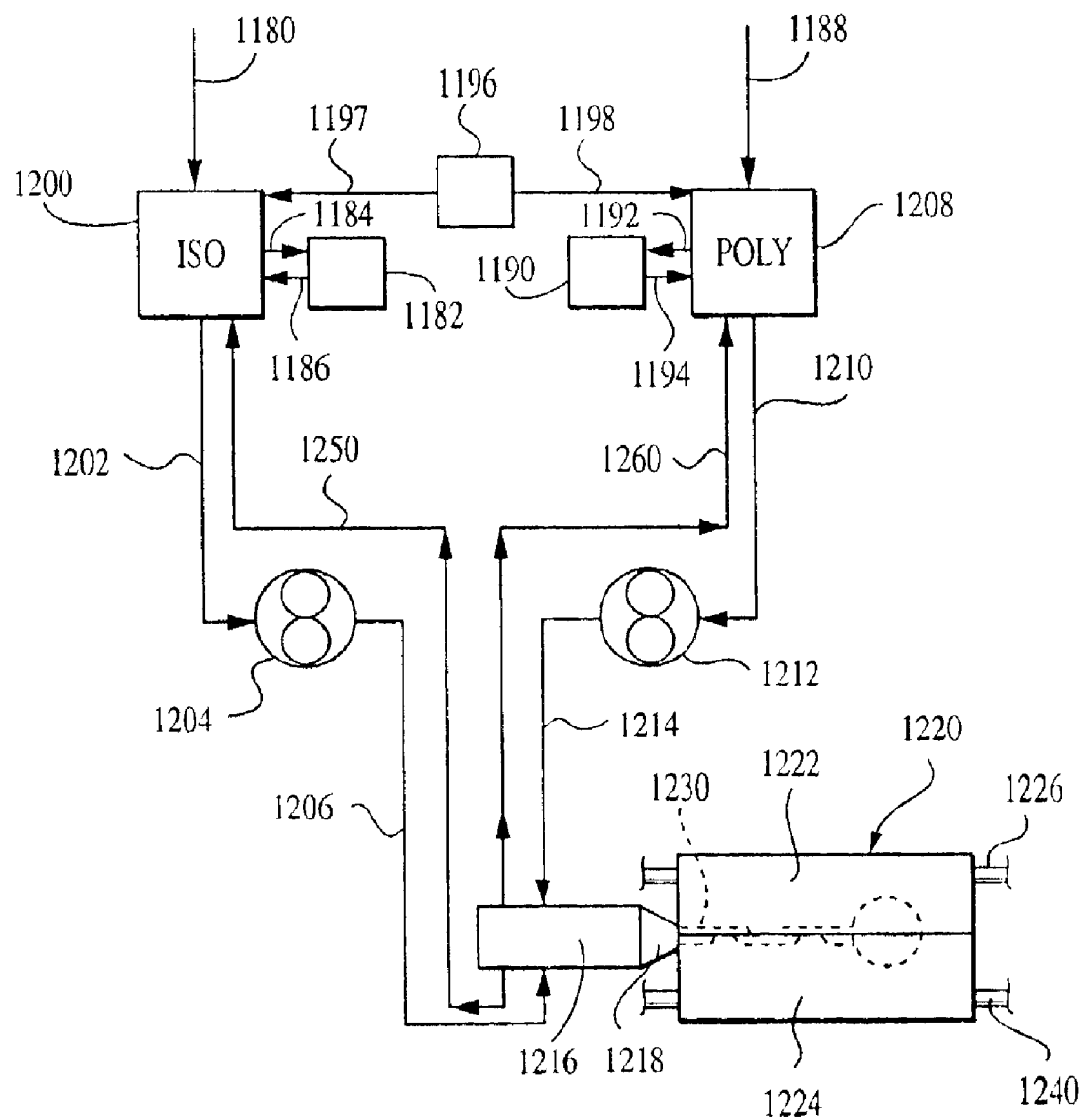
FIG. 20 is a process flow diagram which schematically depicts a reaction injection molding process according to the invention.
Figure 22:
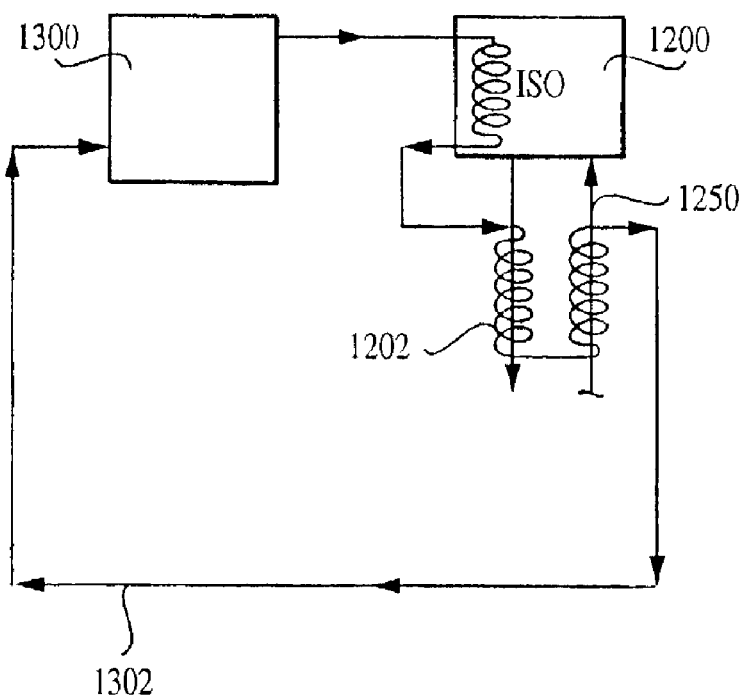
FIG. 22 is a schematic process flow diagram illustrating a heat exchange circuit utilized for an isocyanate feed source.
Figure 23:
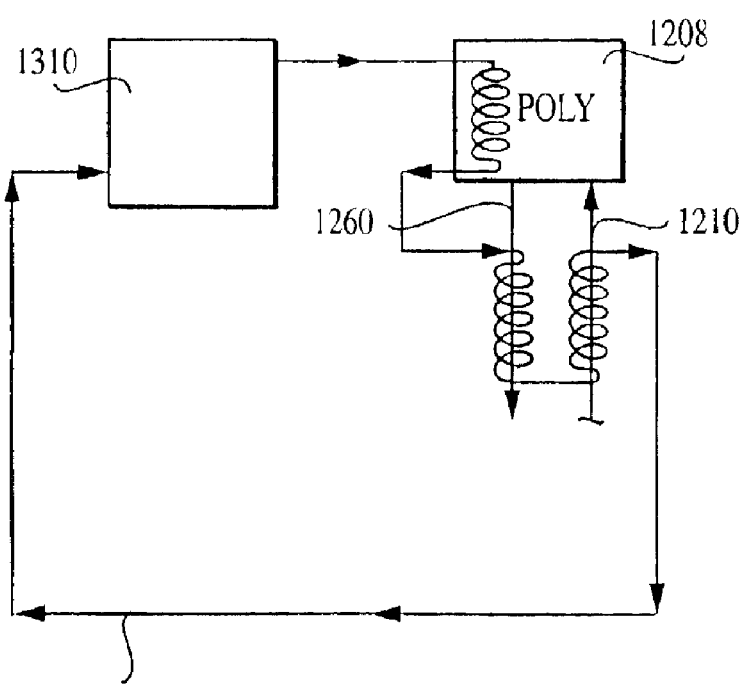
FIG. 23 is a schematic process flow diagram illustrating a heat exchange circuit utilized for a polyol feed source.

Referring next to FIG. 20, a process flow diagram for forming a RIM cover of polyurethane is shown. Isocyanate from bulk storage is fed through line 1180 to an isocyanate (or polyisocyanate) tank 1200. The isocyanate is heated to the desired temperature, e.g., 80° F. to about 220° F., by circulating it through heat exchanger 1182 via lines 1184 and 1186. Polyol, polyamine, or another compound with an active hydrogen atom is conveyed from bulk storage to a polyol tank 1208 via line 1188. The polyol is heated to the desired temperature, e.g., 90° F. to about 180° F., by circulating it through heat exchanger 1190 via lines 1192 and 1194. Generally, it is preferred to heat each reactive component such as the isocyanate and the polyol, to a temperature such that they have the same viscosity. Preferably, these temperatures are about 80° F. to about 220° F. for the polyol component and about 80° F. to about 220° F. for the isocyanate component. More preferably, the polyol is at a temperature of about 100° F. and the isocyanate is at about 200° F. Dry nitrogen gas is fed from nitrogen tank 1196 to isocyanate tank 1200 via line 1197 and to polyol tank 1208 via line 1198. This gaseous blanket is used to prevent oxidation or other deleterious reaction of the injection components. Isocyanate is fed from isocyanate tank 1200 via line 1202 through a metering cylinder or metering pump 1204 into recirculation mix head inlet line 1206. An isocyanate recirculation line 1250 is preferably utilized. Polyol is fed from polyol tank 1208 via line 1210 through a metering cylinder or metering pump 1212 into a recirculation mix head inlet line 1214. A polyol recirculation line 1260 is preferably utilized. A recirculation mix head 1216 receives isocyanate and polyol, mixes them, and provides for them to be fed through nozzle 1218 into injection mold 1220. The injection mold 1220 has a top mold 1222 and a bottom mold 1224. Heat exchange fluid flows through cooling lines 1226 in the top mold 1222 and lines 1240 in the bottom mold 1224. The materials are kept under controlled temperature conditions so that the desired reaction profile is maintained. Preferably, controlled temperatures are maintained by using oil heaters or other heating medium along the entirety of each of the paths or lines for the reactants. Preferably, temperature control of the isocyanate lines 1202 and 1250 is achieved by use of a heat exchanger 1300 and heat exchange line 1302 as shown in FIG. 22. Similarly, temperature control of the polyol lines 1210 and 1260 is achieved by use of a heat exchanger 1310 and heat exchange line 1312 as shown in FIG. 23. Most preferably, a multiple pipe assembly is used for heat exchange in which the isocyanate or polyol materials flows within a central tube or conduit and a heat exchange fluid flows in another portion of the assembly, preferably disposed radially around the conduit housing the isocyanate or polyol material. An effective amount of thermal insulation is preferably disposed around the exterior or outer periphery of the multiple pipe assembly.

The polyol component typically contains additives, such as stabilizers, flow modifiers, catalysts, combustion modifiers, blowing agents, fillers, pigments, optical brighteners, and release agents to modify physical characteristics of the cover Inside the mix head 1216, injector nozzles impinge the isocyanate and polyol at ultra-high velocity to provide excellent mixing. Additional mixing preferably is conducted using an after-mixer 1230, which typically is constructed inside the mold between the mix head and the mold cavity.

Figure 21:
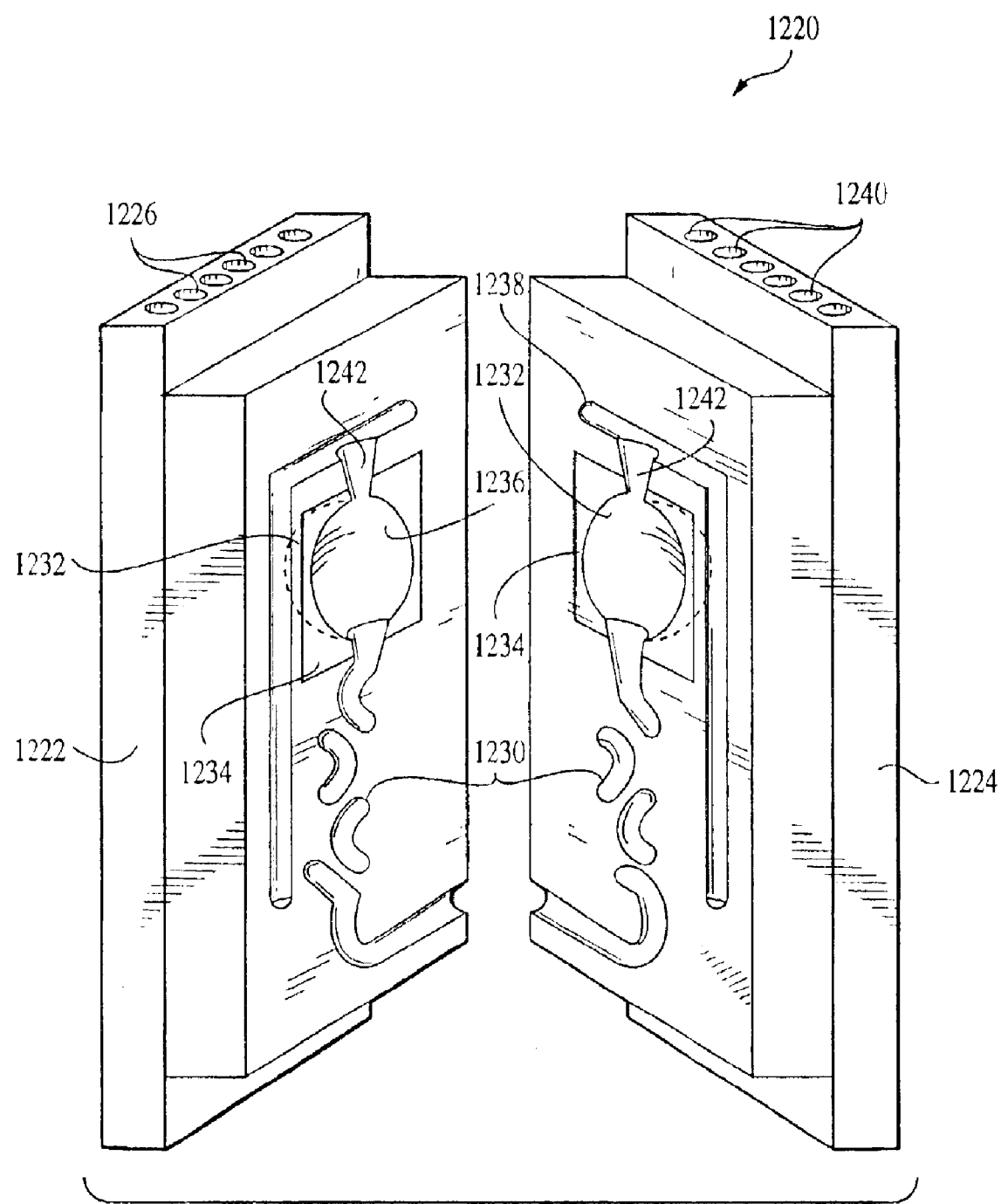
FIG. 21 schematically shows a preferred embodiment molding assembly for reaction injection molding a golf ball cover according to the invention.

As is shown in FIG. 21, the mold 1220 includes a golf ball cavity chamber 1232 in which a spherical golf ball mold 1234 with a dimpled, spherical mold cavity 1236 defined. Preferably, an effective amount of a mold release agent is applied to the molding surfaces of the molding chamber. The aftermixer 1230 can be a peanut aftermixer, as in shown in FIG. 5, or in some cases another suitable type, such as a heart, harp or dipper. An overflow channel 1238 or "dump well" receives overflow material from the golf ball mold 1234 through a shallow vent 1242. Heating/cooling passages 1226 and 1240, which preferably are in a parallel flow arrangement, carry heat transfer fluids such as water, oil, etc. through the top mold 1222 and the bottom mold 1224. Injection may be performed at various pressures, but it is preferred that the pressure at which each of the components is introduced to the molding assembly is approximately equal. Preferably, impingement pressures for a RIM process using an isocyanate and a polyol component are about 150 to about 195 bar, and preferably about 180 bar (all pressures are gauge, i.e. above atmospheric, unless noted otherwise). For the RIM processes described herein, mold cycle times may range from about 30 seconds to up to 5 minutes or more depending upon the properties of the reactants. For a RIM system using a polyol and an isocyanate as described herein, a 60 second molding cycle time has been achieved, and is preferred.

After molding, the golf balls produced may undergo various further processing steps such as buffing, trimming, milling, tumbling, painting and marking as disclosed in U.S. Pat. No. 4,911,451, herein incorporated by reference.

In performing a RIM operation in which polyurethane covers or other golf ball components are formed, it is preferred to use a PSM 90 unit available from Isotherm, AG. The PSM 90 unit is used for processing of elastomers and foamed polyurethane and polyureas. Generally, the polyol and isocyanate components are metered into the PSM 90 and at least partially mixed under high pressure. Depending upon the mixing head used, a wide array of different molding strategies can be used. Additionally, a design guide for after-mixers is provided by Bayer Corporation under the designation "Engineering Polymers, RIM Part and Mold Design, Polyurethanes, a Design Guide," No. PU-CA007, pp. 52–53 and 58, 1995, herein incorporated by reference.

The resulting golf ball is produced more efficiently and less expensively than balls of the prior art. Additionally, the golf balls of the present invention may have multiple cover layers, some of them very thin (less than 0.03 inches, more preferably less than 0.02 inches, even more preferably less than 0.01 inches) if desired, to produce golf balls having specific performance characteristics. For example, golf balls having softer outer cover layer(s) and harder inner cover layer(s) may be produced. Alternatively, golf balls having harder outer cover layer(s) and softer inner cover layer(s) may be produced. Moreover, golf balls having inner and out cover layers with similar hardnesses are also anticipated by the present invention.

For golf balls have three or more layers, the hardness of the layers may be varied alternately, such as hard-soft-hard, or soft-hard-soft, and the like, or golf balls with a cover having a hardness gradient may be produced. The hardness gradient may start with hard inner layers close to the core and get softer at the outer layer, or vice versa. This allows a lot of flexibility and control of finished golf ball properties. As previously described, the layers may be of the same or different materials, and of the same or different thicknesses.

Specifically, the golf ball of the present invention is not particularly limited with respect to its structure and construction. By using well known ball materials and conventional manufacturing processes, the balls may be manufactured as solid golf balls including one-piece golf balls, two-piece golf balls, and multi-piece golf balls with three or more layers and wound golf balls. Furthermore, although a RIM process has been described for forming the various gold balls, cores, intermediate ball assemblies, cover layers, and components thereof, it will be appreciated that other techniques may be used, such as, but not limited to, injection molding, compression molding, cast molding, and other processes known in the art.

The foregoing description is, at present, considered to be the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

Having thus described the invention, we claim:

1. A golf ball having a plurality of deep dimples defined along an outer surface of said golf ball, said golf ball comprising:
   a core; and
   a cover layer disposed about said core, said cover layer having an outer surface and a thickness and defining a plurality of dimples along said outer surface, wherein at least 5% of said dimples have a depth greater than said thickness of said cover layer and extend through said cover layer.

2. The golf ball of claim 1, wherein at least 10% of said dimples have a depth greater than said thickness of said cover layer.

3. The golf ball of claim 1, wherein at least 20% of said dimples have a depth greater than said thickness of said cover layer.

4. The golf ball of claim 1, wherein at least 30% of said dimples have a depth greater than said thickness of said cover layer.

5. The golf ban of claim 1, wherein at least 40% of said dimples have a depth greater than said thickness of said cover layer.

6. The golf ball of claim 1, wherein at least 50% of said dimples have a depth greater than said thickness of said cover layer.

7. The golf ball of claim 1, wherein at least 60% of said dimples have a depth greater than said thickness of said cover layer.

8. The golf ball of claim 1, wherein at least 70% of said dimples have a depth greater than said thickness of said cover layer.

9. The golf ball of claim 1, wherein at least 80% of said dimples have a depth greater than said thickness of said cover layer.

10. The golf ball of claim 1, wherein at least 90% of said dimples have a depth greater than said thickness of said cover layer.

11. The golf ball of claim 1, wherein all of said dimples have a depth greater than said thickness of said cover layer.

12. A golf ball comprising:
   a core; and
   a cover layer disposed about said core, said cover layer having a thickness and defining at least two populations of dimples along an outer surface of said cover layer, wherein a first population of dimples includes dimples having a depth greater than said thickness of said cover layer and a second population of dimples includes dimples having a depth less than said thickness of said cover layer, said first population constituting at least a minority proportion of the total number of dimples defined along said outer surface of said cover layer.

13. The golf ball of claim 12, wherein said first population constitutes about half of the total number of dimples defined along said outer surface of said cover layer.

14. The golf ball of claim 12, wherein said first population constitutes a majority of the total number of dimples defined along said outer surface of said cover layer.

15. The golf ball of claim 12, wherein said cover layer defines three populations of dimples.

16. The golf ball of claim 12, wherein said cover layer defines four populations of dimples.

17. The golf ball of claim 12, wherein said cover layer defines five populations of dimples.

18. The golf ball of claim 12, wherein said cover layer defines six populations of dimples.

19. The golf ball of claim 12, wherein said cover layer is formed via reaction injection molding.

\* \* \* \* \*